(12) United States Patent
Weston et al.

(10) Patent No.: US 9,968,882 B2
(45) Date of Patent: May 15, 2018

(54) CYCLIC THERMAL SWING ADSORPTION WITH DIRECT HEAT TRANSFER

(71) Applicant: ExxonMobil Research and Engineering Company, Annandale, NJ (US)

(72) Inventors: Simon C. Weston, Annandale, NJ (US); Mobae Afeworki, Phillipsburg, NJ (US); Bhupender S. Minhas, Bridgewater, NJ (US); Ramesh Gupta, Berkeley Heights, NJ (US); Hugo S. Caram, Allentown, PA (US); Manoj K. Chaudhury, Bethlehem, PA (US); Hans Thomann, Bedminster, NJ (US); Hilda B. Vroman, Piscataway, NJ (US); Meghan Nines, Lansdale, PA (US)

(73) Assignee: EXXONMOBIL RESEARCH AND ENGINEERING COMPANY, Annandale, NJ (US)

( * ) Notice: Subject to any disclaimer, the term of this patent is extended or adjusted under 35 U.S.C. 154(b) by 76 days.

(21) Appl. No.: 15/274,382

(22) Filed: Sep. 23, 2016

(65) Prior Publication Data
US 2017/0087506 A1    Mar. 30, 2017

Related U.S. Application Data

(60) Provisional application No. 62/232,685, filed on Sep. 25, 2015.

(51) Int. Cl.
*B01D 53/04* (2006.01)
*B01J 20/22* (2006.01)
(Continued)

(52) U.S. Cl.
CPC ..... *B01D 53/0462* (2013.01); *B01D 53/0423* (2013.01); *B01D 53/0446* (2013.01);
(Continued)

(58) Field of Classification Search
CPC ............ B01D 53/0423; B01D 53/0446; B01D 53/0462; B01D 53/1475; B01D 2253/108;
(Continued)

(56) References Cited

U.S. PATENT DOCUMENTS 4,526,757 A    7/1985 Gupta
5,480,624 A *  1/1996 Kuivalainen ........ B01D 53/501
                                                 423/210
(Continued)

OTHER PUBLICATIONS

PCT/US2016/053383 International Search Report and Written Opinion dated Dec. 15, 2016.
(Continued)

*Primary Examiner* — Frank Lawrence
(74) *Attorney, Agent, or Firm* — Andrew T. Ward

(57) ABSTRACT

A heat transfer fluid can be used as part of a multi-phase adsorption environment to allow for improved separations of gas components using a solid adsorbent. The heat transfer fluid can reduce or minimize the temperature increase of the solid adsorbent that occurs during an adsorption cycle. Reducing or minimizing such a temperature increase can enhance the working capacity for an adsorbent and/or enable the use of adsorbents that are not practical for commercial scale adsorption using conventional adsorption methods. The multi-phase adsorption environment can correspond to a trickle bed environment, a slurry environment, or another convenient environment where at least a partial liquid phase of a heat transfer fluid is present during gas adsorption by a solid adsorbent.

26 Claims, 11 Drawing Sheets

(51) Int. Cl.
*B01J 20/26* (2006.01)
*B01J 20/18* (2006.01)
*B01J 20/32* (2006.01)
*B01D 53/14* (2006.01)

(52) U.S. Cl.
CPC .............. *B01J 20/18* (2013.01); *B01J 20/22* (2013.01); *B01J 20/226* (2013.01); *B01J 20/262* (2013.01); *B01J 20/3204* (2013.01); *B01J 20/3206* (2013.01); *B01J 20/3214* (2013.01); *B01J 20/3246* (2013.01); *B01J 20/3272* (2013.01); *B01D 53/1475* (2013.01); *B01D 2253/108* (2013.01); *B01D 2253/204* (2013.01); *B01D 2253/25* (2013.01); *B01D 2257/504* (2013.01); *Y02C 10/08* (2013.01)

(58) Field of Classification Search
CPC .......... B01D 2253/204; B01D 2253/25; B01D 2257/504; B01J 20/18; B01J 20/22; B01J 20/226; B01J 20/262; B01J 20/3204; B01J 20/3206; B01J 20/3214; B01J 20/3246; B01J 20/3272; Y02C 10/08
USPC .................. 95/90, 108, 115, 139; 96/150
See application file for complete search history.

(56) References Cited

U.S. PATENT DOCUMENTS

| | | |
|---|---|---|
| 5,799,877 A | 9/1998 | Gupta et al. |
| 7,507,274 B2 | 3/2009 | Tonkovich et al. |
| 8,142,745 B2 | 3/2012 | Reyes et al. |
| 8,784,533 B2 | 7/2014 | Leta et al. |
| 8,814,986 B2 | 8/2014 | Yeganeh et al. |
| 9,604,195 B2* | 3/2017 | Eddaoudi ............... B01J 20/226 |
| 2014/0216263 A1 | 8/2014 | Ogino |
| 2014/0219899 A1* | 8/2014 | Lackner ................ B01D 53/62 423/228 |
| 2016/0199808 A1* | 7/2016 | Yoshikawa ............ B01J 20/08 96/146 |

OTHER PUBLICATIONS

McDonald et al., "Capture of Carbon Dioxide From Air and Flue Gas in the Alkylamine-Appended Metal-Organic Framework mmem-Mg2(dobpdc)", Journal of the American Chemical Society, Apr. 4, 2012, pp. 7056-7065, vol. 134, iss. 16, ACS Publications.

* cited by examiner

CYCLIC THERMAL SWING ADSORPTION WITH DIRECT HEAT TRANSFER

CROSS REFERENCE TO RELATED APPLICATIONS

This application claims priority to U.S. Provisional Application Ser. No. 62/232,685 filed on Sep. 25, 2015, herein incorporated by reference in its entirety.

FIELD

Systems and methods are provided for improving the working capacity of adsorbents during swing adsorption processes.

BACKGROUND

Gas separation is important in many industries and can typically be accomplished by flowing a mixture of gases over an adsorbent that preferentially adsorbs a more readily adsorbed component relative to a less readily adsorbed component of the mixture. One of the more important types of gas separation technology is swing adsorption, such as pressure swing adsorption (PSA). PSA processes rely on the fact that under pressure gases tend to be adsorbed within the pore structure of the microporous adsorbent materials or within the free volume of a polymeric material. The higher the pressure, the greater the amount of targeted gas component will be adsorbed. When the pressure is reduced, the adsorbed targeted component is released, or desorbed. PSA processes can be used to separate gases of a gas mixture because different gases tend to fill the micropore or free volume of the adsorbent to different extents.

Another important gas separation technique is temperature swing adsorption (TSA). TSA processes also rely on the fact that under pressure gases tend to be adsorbed within the pore structure of the microporous adsorbent materials or within the free volume of a polymeric material. When the temperature of the adsorbent is increased, the adsorbed gas is released, or desorbed. By cyclically swinging the temperature of adsorbent beds, TSA processes can be used to separate gases in a mixture when used with an adsorbent that is selective for one or more of the components in a gas mixture.

Conventional temperature swing adsorption (TSA) processes use a solid adsorbent for the selective adsorption of a desired gas component at a lower temperature followed by desorption of the component at higher temperature. A conventional solid adsorbent can correspond to a monolith type structure or to a bed of solid adsorbent particles. The presence of both a gas and a liquid during adsorption is typically avoided.

U.S. Pat. No. 8,784,533 describes a temperature and/or pressure swing adsorption process using a solid adsorbent, such as an adsorbent provided as a parallel channel contactor. The temperature of the solid adsorbent can be controlled by introducing a heating and/or cooling fluid through heating and/or cooling channels in the adsorbent that are not in fluid communication with the channels that provide the feed gas for separation. This can allow physical contact between the heating and/or cooling fluid without exposing the gas being separated to the fluid.

SUMMARY

In one aspect, a method for adsorbing a gas component is provided, the method comprising exposing an input fluid comprising a first gas component and a heat transfer fluid to adsorbent particles to produce an adsorbent effluent having a lower concentration of the first gas component than the input fluid, the input fluid comprising a first temperature prior to contacting the adsorbent particles, a loading of adsorbed first gas component in the adsorbent particles at the end of the exposing being at least about 0.01 mol/kg, or at least about 0.1 mol/kg, or at least about 0.2 mol/kg, or at least about 0.5 mol/kg, or at least about 1.0 mol/kg, or at least about 2.0 mol/kg, or at least about 3.0 mol/kg; and desorbing at least a portion of the first gas component from the adsorbent particles at a desorption temperature greater than the first temperature. As used herein, adsorbent particles include extrudates, pellets, formed and sieved powders, and any other formed powders. Said adsorbents need not be 100% pure and can include typical binders such as silica, alumina, and polymeric materials.

In another aspect, a method for adsorbing $CO_2$ is provided, the method comprising exposing an input fluid comprising $CO_2$ and a heat transfer fluid to adsorbent particles to produce an adsorbent effluent having a lower concentration of $CO_2$ than the input fluid, the input fluid comprising a first temperature prior to contacting the adsorbent particles, a loading of adsorbed $CO_2$ in the adsorbent particles at the end of the exposing being at least about 0.01 mol/kg, or at least about 0.1 mol/kg, or at least about 0.2 mol/kg, or at least about 0.5 mol/kg, or at least about 1.0 mol/kg, or at least about 2.0 mol/kg, or at least about 3.0 mol/kg; and desorbing $CO_2$ from the adsorbent particles at a desorption temperature greater than the first temperature.

In still another aspect, a method for adsorbing a gas component is provided, the method comprising exposing an input fluid comprising a first gas component and a heat transfer fluid to adsorbent particles comprising a Type V adsorbent to produce an adsorbent effluent having a lower concentration of the first gas component than the input fluid, the input fluid comprising a first temperature prior to contacting the adsorbent particles, a loading of adsorbed first gas component in the adsorbent particles at the end of the exposing being at least about 0.01 mol/kg, or at least about 0.1 mol/kg, or at least about 0.2 mol/kg, or at least about 0.5 mol/kg, or at least about 1.0 mol/kg, or at least about 2.0 mol/kg, or at least about 3.0 mol/kg; and desorbing at least a portion of the first gas component from the adsorbent particles at a desorption temperature greater than the first temperature.

In yet another aspect, a method for adsorbing a gas component is provided, the method comprising: exposing an input fluid comprising a first gas component and a heat transfer fluid to adsorbent particles to produce an adsorbent effluent having a lower concentration of the first gas component than the input fluid, the input fluid comprising a first temperature prior to contacting the adsorbent particles, a loading of adsorbed first gas component in the adsorbent particles at the end of the exposing being at least about 0.01 mol/kg, or at least about 0.1 mol/kg, or at least about 0.2 mol/kg, or at least about 0.5 mol/kg, or at least about 1.0 mol/kg, or at least about 2.0 mol/kg, or at least about 3.0 mol/kg; and desorbing at least a portion of the first gas component from the adsorbent particles at a desorption temperature, the desorption temperature being less than about 10° C. different from the first temperature.

In still another aspect, a contactor for separation of $CO_2$ from a gas flow is to provide the contactor comprising a bed of adsorbent particles, the adsorbent particles comprising mmen-$Mg_2$(dobpdc) having an adsorbent loading of at least about 3.0 moles of $CO_2$ per kilogram of adsorbent. Optionally, the contactor can be a trickle bed contactor.

DETAILED DESCRIPTION OF THE EMBODIMENTS

Overview

Figure 1:
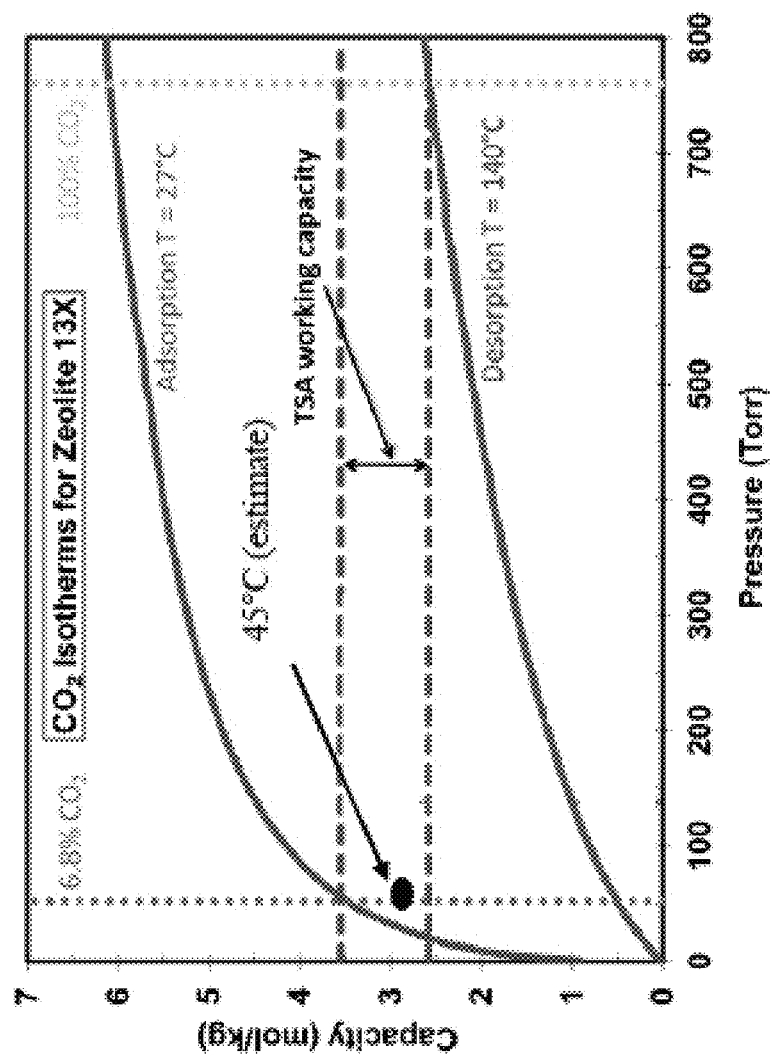
FIG. 1 schematically shows an example of adsorption isotherms and potential working capacity for adsorption of $CO_2$ by a Type I adsorbent.

In various aspects, a heat transfer fluid can be used as part of a multi-phase adsorption environment to allow for improved separations of gas components using a solid adsorbent. The heat transfer fluid can reduce or minimize the temperature increase of the solid adsorbent that occurs during an adsorption cycle. Reducing or minimizing such a temperature increase can enhance the working capacity for an adsorbent and/or enable the use of adsorbents (such as Type V adsorbents) that are not practical for commercial scale adsorption using conventional adsorption methods. The multi-phase adsorption environment can correspond to a trickle bed environment, a slurry environment, or another convenient environment where at least a partial liquid phase of a heat transfer fluid is present during gas adsorption by a solid adsorbent. The heat transfer fluid used herein includes liquids, gases, and liquids that may flash to gases based on the heat of adsorption, thereby further advancing heat transfer via evaporation.

In some aspects, a swing adsorption process can be performed using a bed of adsorbent particle in a trickle bed contactor configuration. This can allow for direct heat transfer in combination with using relative liquid/gas velocities in a way that the thermal front moves faster than the adsorption front. This can allow for improved heat recuperation and/or thermal management of the adsorbent. Any loss of adsorption capacity from heat of adsorption can be reduced or minimized, which can make the use of high capacity adsorbents more practical, including (but not limited to) type V adsorbents.

Swing adsorption processes can have an adsorption step in which a feed mixture (typically in the gas phase) is flowed over and/or exposed to an adsorbent that can preferentially adsorb a more readily adsorbed component relative to a less readily adsorbed component. A component may be more readily adsorbed because of kinetic or equilibrium properties of the adsorbent. The adsorbent is typically contained in a contactor that is part of the swing adsorption unit. In this discussion, a contactor can contain a particulate adsorbent bed, or alternatively the particulate adsorbent can be suspended in a heat transfer fluid to form a slurry. Other components in the swing adsorption unit can be valves, piping, tanks, and other contactors. In some aspects, a plurality of contactors can be used as part of a swing adsorption system. This can allow adsorption and desorption to be performed as a continuous process, with one or more contactors being used for adsorption while one or more additional contactors are used for desorption. As contactors approach maximum loading during adsorption and/or approach complete desorption under the desorption conditions, the flows to the contactors can be switched between adsorption and desorption. It is noted that after the desorption step, the adsorbent may retain a substantial loading of the gas component. In various aspects, the loading of the adsorbent with the adsorbed gas component at the end of the desorption step can be at least about 0.001 mol/kg, or at least about 0.01 mol/kg, or at least about 0.1 mol/kg, or at least about 0.2 mol/kg, or at least about 0.5 mol/kg, or at least about 1.0 mol/kg, and/or about 3.0 mol/kg or less, or about 2.5 mol/kg or less, or about 2.0 mol/kg or less, or about 1.5 mol/kg or less, or about 1.0 mol/kg or less, or about 0.1 mol/kg or less. Additionally or alternately, the loading at the end of the desorption step can be characterized relative to the loading at the end of the prior adsorption step. The loading of the adsorbent with the adsorbed gas component at the end of the desorption step can be at least about 0.01% of the adsorbent loading at the end of the prior adsorption step, or at least about 0.1%, or at least about 1%, or at least about 5%, or at least about 10%, or at least about 20%, or at least about 30%, or at least about 50%, and/or about 90% or less, or about 70% or less, or about 50% or less, or about 40% or less, or about 30% or less, or about 20% or less, or about 10% or less, or about 5% or less, or about 1% or less, or about 0.1% or less.

The method of adsorbent regeneration designates the type of swing adsorption process. Pressure swing adsorption (PSA) processes rely on the fact that gases under pressure tend to be adsorbed within the pore structure of the microporous adsorbent materials. The higher the pressure, the greater the amount of targeted gas component that will be adsorbed. When the pressure is reduced, the adsorbed targeted component is released, or desorbed. PSA processes can be used to separate gases of a gas mixture because different gases tend to fill the micropore or free volume of the adsorbent to different extents due to either the equilibrium or kinetic properties of the adsorbent. Temperature swing adsorption (TSA) processes also rely on the fact that gases under pressure tend to be adsorbed within the pore structure of the microporous adsorbent materials. When the temperature of the adsorbent is increased, the adsorbed gas is released, or desorbed. By cyclically swinging the temperature of adsorbent beds, TSA processes can be used to separate gases in a mixture when used with an adsorbent that is selective for one or more of the components in a gas mixture.

Temperature swing adsorption (TSA) processes, also referred to as thermal swing adsorption processes, can employ an adsorbent that is repeatedly cycled through at least two steps—an adsorption step and a thermally assisted regeneration step. Regeneration of the adsorbent can be achieved by heating the adsorbent to an effective temperature to desorb target components from the adsorbent. The adsorbent can then be cooled so that another adsorption step can be completed. The cycle time between successive adsorption steps for TSA process can typically be on the order of minutes, such as from about 0.2 minutes to about 120 minutes or more. In some aspects, the cycle time between successive adsorption steps for a TSA process can be less than about 30 minutes, or less than about 10 minutes, or less than about 2 minutes, or less than about 1 minute. The cycle time can depend in part on the nature of the adsorbent bed, such as the depth of the bed for a trickle bed contactor. TSA processes can be used to obtain very high product recoveries in the excess of 90 vol %, for example greater than 95 vol % or, in some cases, greater than 98 vol %. The term "adsorption" as used herein includes physisorption, chemisorption, and condensation onto a solid support, absorption into a solid supported liquid, chemisorption into a solid supported liquid, and combinations thereof.

A TSA cycle can also typically include a change in the temperature of the adsorbent from the temperature for the adsorption step to the temperature for the desorption step. The adsorption step can be defined based on the time when the gas flow is started for the input gas containing the component for adsorption and when the gas flow is stopped. The desorption step can be defined based on the time when gas being desorbed from the adsorbent is collected to the time collection is stopped. Any time in the cycle outside of those steps can be used for additional adjustment of the adsorbent temperature. In some aspects, a heat transfer fluid can allow a TSA cycle to be performed that corresponds to only the adsorption step and the desorption step, as the heat transfer fluid can allow an adsorption/desorption step to be started without necessarily requiring an intervening step to adjust the temperature of the bed.

A potential advantage of a TSA separation can be that the process can be performed at a convenient pressure, or with a small amount of variation around a convenient pressure. For example, a goal of a TSA separation can be to develop a substantially pure stream of a gas component that is adsorbed and then desorbed. In this type of aspect, a convenient pressure for the desorption step can be a temperature of about 1 bar (0.1 MPa) or less. Attempting to desorb a stream at greater than about 0.1 MPa can require substantial additional temperature increase for desorption. Additionally, ambient pressure can be a convenient pressure for the adsorption step as well, as many streams containing a gas component for adsorption can correspond to "waste" or flue gas streams that may be at low pressure. In some aspects, the pressure difference between the adsorption and desorption steps can be about 1 MPa or less, or about 0.2 MPa or less, or about 0.1 MPa or less, or about 0.05 MPa or less, or about 0.01 MPa or less.

A variety of types of solid adsorbents are available for separation of components from a gas flow using temperature swing adsorption (TSA). During a conventional TSA process, at least one component in a gas flow can be preferentially adsorbed by the solid adsorbent, resulting in a stream with a reduced concentration of the adsorbed component. The adsorbed component can then be desorbed and/or displaced from the solid adsorbent, optionally to form a stream having an increased concentration of the adsorbed component.

In this description, reference may be made at various locations to adsorbing $CO_2$ from a gas feed and subsequently desorbing a substantially pure $CO_2$ stream. This example is used to illustrate concepts, and those of skill in the art will understand that the general principles illustrated can be applied to any convenient combination of gas component and adsorbent for performing temperature swing adsorption. In this illustrative example, a flue gas from a refinery process or a coal/gas power plant can have a $CO_2$ concentration of about 0.1 vol % to about 15 vol %. It would be desirable to be able to adsorb $CO_2$ from the flue gas stream and then desorb the $CO_2$ to form a concentrated $CO_2$ stream, such as a stream having at least 90 vol % $CO_2$, or at least 95 vol %, or at least 98 vol %. The amount of $CO_2$ (or another gas component) that can be adsorbed and then desorbed as part of an adsorption/desorption cycle is referred to as a working capacity for the adsorbent with respect to $CO_2$/the gas component.

FIG. 1 shows an example of $CO_2$ adsorption isotherms for zeolite 13X. It is noted that use of zeolite 13X for adsorption/desorption of $CO_2$ can pose some difficulties due to the presence of $H_2O$ in typical flue gases. However, zeolite 13X is suitable for illustrating the concepts of an adsorption/desorption cycle. In FIG. 1, a $CO_2$ concentration of 6.8 mol % was selected as a representative dilute concentration for $CO_2$, such as a concentration of $CO_2$ that might occur in a flue gas. In FIG. 1, the vertical dotted lines show the partial pressure of $CO_2$ (at 1 bar or 0.1 MPa of total pressure) that corresponds to a concentration of either 6.8 mol % or 100 mol %. As shown in FIG. 1, the adsorption isotherm changes with temperature, with lower temperatures corresponding to higher amounts of adsorbed $CO_2$ at a given temperature.

One method for determining a working capacity is based on adsorption isotherms for a gas component/solid adsorbent combination. Using the adsorption isotherms, and based on an expected concentration of the gas component during adsorption and desorption, the working capacity can be calculated as the difference in the adsorbed amount of the gas component under the adsorption and desorption conditions. The values shown in FIG. 1 can allow for determination of a working capacity for $CO_2$ adsorption by zeolite 13X at an adsorption temperature of 27° C. and a desorption temperature of 140° C. Based on the values of FIG. 1, at a total pressure of about 0.1 MPa, the working capacity of the adsorbent is about 1.0 moles $CO_2$ per kilogram of adsorbent, as shown by the horizontal lines in FIG. 1. The intersection of the 27° C. isotherm and the dotted vertical line corresponding to 6.8 mol % $CO_2$ represents the adsorption capacity of the adsorbent for adsorption of $CO_2$ from a gas stream during a hypothetical adsorption step at 0.1 MPa and 27° C., which is about 3.5 mol $CO_2$/kg. Similarly, the intersection of the 140° C. isotherm and the dotted vertical line corresponding to 100% $CO_2$ represents the expected amount of $CO_2$ retained by the adsorbent when attempting to desorb a substantially pure $CO_2$ stream at 140° C. and 0.1 MPa, which is about 2.5 mol $CO_2$/kg. The horizontal lines in FIG. 1 illustrate the difference in these values, corresponding to the working capacity of about 1 mol $CO_2$/kg.

The above calculation of a working capacity based on the 27° C. isotherm and the 140° C. isotherm represents an idealized value for the working capacity. Unfortunately, real working capacities for adsorbents are typically lower than the idealized value due to temperature increases in an adsorbent during the adsorption portion of a cycle. When a gas component is adsorbed by a solid adsorbent, an amount of heat corresponding to a heat of adsorption can be generated. This generated heat typically leads to an increase in the temperature of the adsorbent, due in part to the limited heat capacity of a gas flow to transport heat away from the adsorbent. For an adsorption amount roughly corresponding to a mole per kilogram, the corresponding temperature increase of the adsorbent can be on the order of tens of degrees Celsius. FIG. 1 shows an example of how this increase in the temperature of the adsorbent can impact the working capacity. For the example shown in FIG. 1, an increase in the adsorbent temperature from 27° C. to 45° C. (a representative temperature increase which could occur based on adsorption of a gas component by an adsorbent) can shift the isotherm. At 45° C., the intersection of the 6.8 mol % $CO_2$ vertical line and the adsorption isotherm leads to an adsorption capacity of about 2.75 mol $CO_2$/kg. Thus, in the example shown in FIG. 1, the heating due to adsorption of $CO_2$ by the adsorbent can result in a reduction of working capacity from about 1.0 moles per kilogram to about 0.25 moles per kilogram.

The above difficulty with conventional TSA processes can be reduced or minimized by performing adsorption in a multi-phase environment that also includes the presence of a heat transfer fluid. Due to low heat capacities and/or low heat transfer rates, gas phase fluids can have a limited ability to transport heat away from an adsorbent during the time scales that are desirable for a TSA cycle. Liquids typically can have a higher heat capacity than gases and can also have higher heat transfer rates for transferring heat to/from a solid. By using a heat transfer fluid as part of the adsorption environment, the temperature of the adsorbent can be maintained at or near a desired temperature during adsorption. This can allow for an improved working capacity for some adsorbents. This can also enable the use of adsorbents, such as Type V adsorbents, that are not practical for use if substantial temperature variations occur during the adsorption step of an adsorption/desorption cycle.

In various aspects, an advantage of using a HTF that can contact the adsorbent is that the HTF can modify the temperature of the adsorbent via direct heat transfer. This is in contrast to indirect heat transfer. A parallel channel contactor, such as the configuration described in U.S. Pat. No. 8,784,533, is an example of a swing adsorption contactor that uses indirect heat transfer for thermal management. In a parallel channel contactor, heat has to conduct through a wall to transfer from a utility fluid or other heat transfer fluid to the adsorbent. This is in contrast to using an HTF that is in direct contact with an adsorbent, as described herein, where heat transfer can occur directly from adsorbent to HTF without having to be conducted through an intermediate wall or barrier.

The direct heat transfer enabled by use of a HTF that can contact an adsorbent can provide one or more advantages over a system that uses indirect heat transfer. Some advantages can be practical, such as avoiding the increased complexity and/or cost of manufacturing a system where a heat transfer fluid is kept separate from a gas flow (or fluid flow) containing a gas component for adsorption. Other advantages can be related to the improved efficiency of heat transfer that is provided by a direct heat transfer mechanism. For example, because indirect heat transfer is slow and therefore an adsorbent cannot be instantaneously or rapidly cooled, the adsorption capacity of an adsorbent can be reduced or minimized due to a heating cause by the release of heat of adsorption during an adsorption step. This can particularly impact adsorbents having a Type 5 adsorption profile. This reduction in adsorption capacity when using indirect heat transfer can lead to reduced or minimized adsorption of a gas component for adsorption (such as $CO_2$ from flue gas). Additionally, the speed of gas flow in a typical commercial vessel can be relatively fast (several cm/sec) and cannot "wait" for the adsorbent to cool by the slow conducting heat provided by indirect heat transfer. As a result, if a gas flow for adsorption is introduced immediately after the end of a desorption step, a substantial portion of the gas flow may be able to escape from the product end of the adsorber with a reduced and/or modest amount of removal of $CO_2$ (or another desired gas component for adsorption). Overcoming this problem can require including a substantial delay between the end of a desorption step and the beginning of a subsequent adsorption step to allow for reduction of the adsorbent temperature by indirect heat transfer.

Another option for managing temperature using only indirect heat transfer can be to use a parallel channel monolith. For such a parallel channel monolith where indirect heat transfer is used for temperature management, the adsorbent can be either wash-coated on channel walls or it can be loaded as small pellets in channels that are not exposed to a heat transfer fluid. However, these solutions based on indirect heat transfer for temperature management can also pose difficulties. When a wash-coating is used, the volumetric efficiency of adsorbent (mass of adsorbent per volume of the adsorber) can be low. This may cause the adsorber size to become impractically large in a commercial setting. For adsorbent particles packed in channels to exposed to a liquid, the walls of the structure that provide separation between the adsorbent particles and the heat transfer fluid can introduce additional heat transfer resistance, which can further reduce the speed of the indirect heat transfer.

Adsorbents can be characterized based on the type of adsorption isotherm the adsorbent has for a given gas component. Adsorbents can generally be classified into six types based on the 1985 IUPAC classification of adsorption isotherms. Type I adsorbents have adsorption isotherms that correspond to monolayer adsorption of a gas component and that can generally be represented by a Langmuir Adsorption Isotherm. For a Type I isotherm, a monolayer can be readily adsorbed, with little or no additional adsorption beyond a monolayer as pressure increases. Type II adsorbents have adsorption isotherms corresponding to multi-layer adsorption, with a plateau at intermediate pressures corresponding to monolayer adsorption. Type III adsorbents exhibit multi-layer adsorption without an intermediate plateau corresponding to monolayer adsorption. Type IV and Type V adsorbents are similar to Type II and Type III adsorbents, respectively, but correspond to adsorbents having micropores and/or mesopores that can allow for capillary condensation. This can result in hysteresis in adsorbent behavior. Type VI isotherms represent a stepwise adsorption process, in which successive two-dimensional phase transitions may take place. It is noted that some adsorbents may not have "isotherms" for adsorption under the strict definition of an isotherm. This can be due, for example, to structural and/or phase changes that occur in the adsorbent as the temperature changes. In this discussion, adsorbents are defined as Type I-Type VI adsorbents based on the corresponding IUPAC classification, even if the shape of the adsorption profile does not represent a true "isotherm" due to changes in the adsorbent structure during adsorption.

Contactor Configuration

In various aspects, improved control over the temperature of a solid adsorbent can be achieved by including a heat transfer fluid as part of a gas-liquid-solid adsorption environment.

The inclusion of a heat transfer fluid can be facilitated by using a contactor (adsorber) configuration that is compatible with having a substantial flow of liquid within the adsorption environment. Conventional contactor configurations can often have a net direction of gas flow that is roughly parallel to the direction of gravitational pull. In this type of configuration, the adsorbent within a contactor vessel can be in the form of a bed of particles, a coating on a plurality of parallel channels, a coated monolith, or another conventional configuration. While this orientation can be beneficial for allowing the direction of flow to be reversed within a contactor vessel, such an orientation can present difficulties if a liquid phase is present.

Instead of using a conventional contactor vessel and/or configuration, a multiphase gas-liquid-solid contactor may exist in many different configurations depending upon the physical properties of the gas, liquid and solid phases, flow rate of each phase, flow directions of each phase (e.g., upward or downward), size and geometry of the contactor vessel, and mixing patterns in the contactor vessel. For example, the solid adsorbent particles may be stationary in the contactor while the gas and the liquid may move in and out of the contactor vessel. The gas and liquid may move in the same direction (co-current) or in the opposing direction (counter-current). Also the flow may be in the direction or opposite to the direction of an external force field (e.g., gravitational force).

Examples of suitable contactor or reactor systems can include slurry reaction systems, up-flow fixed bed reaction systems, counter-current fixed bed reaction systems, and trickle bed reaction systems. While these examples of reactor systems are known for use in hydroprocessing and/or other refinery processes, use of these configurations as contactors involves various additional or different considerations. Each contactor flow configuration can have its own advantages and limitations, such as susceptibility of the solid adsorbent particles to attrition, ease and practicality of moving each phase (solid, liquid, gas) in and out of the contactor vessel, pressure drop in the vessel, and how the three phases are distributed in the vessel and interact with each other. Of particular importance can be the mass transfer rates that may be obtained between the adsorbing gas (e.g., $CO_2$ in flue gas) and the solid adsorbent. Temperature distribution in the vessel can also be important due to the relationship between the temperature and the amount of a particular gas that is adsorbed.

In some aspects, a trickle bed contactor configuration can be used. A trickle bed uses a fixed bed of solid adsorbent particles through which a gas mixture and heat transfer fluid (HTF) flow in the downward direction. The flowing gas fills the empty space in between the adsorbent particles, and the liquid trickles down as rivulets and films. Typically, the gas phase corresponds to a continuous phase during trickle bed operation, but if the flow of heat transfer fluid is sufficient a continuous liquid phase may also be present. In addition to a trickle flow regime, other flow regimes that can be used include a "naturally pulsing regime" and/or a "spray flow regime". These alternative modes of operation are typically less attractive, but can still be suitable for adsorption/desorption processes as described herein.

Trickle flow operation and/or other configurations involving co-current downward flow of gas and liquid can provide a variety of advantages. Although the HTF is present in the adsorption environment, the gas can typically remain as the continuous fluid phase. Depending on the amount of HTF and the ability of the HTF to wet the adsorbent surface, at least a portion of the adsorbent surface area can be exposed directly to the continuous gas phase (i.e., gas does not have to pass through a liquid film or layer). Additionally or alternately, during trickle flow operation the adsorbent particles are not susceptible to bed fluffing or fluidization and can have a very low susceptibility to adsorbent attrition. Also, trickle bed can allow for energy recuperation for reuse (as described below).

During trickle bed operation and/or operation in other flow regimes where gas and liquid are introduced for co-current downward flow, the wetting characteristics of the heat transfer fluid for the adsorbent particles can lead to two different types of interactions. In a first scenario, the adsorbent can be wetted by the HTF. This can cause a film to form around an adsorbent particle and can also fill the pores inside a porous adsorbent particle. In a second scenario, the surface energies at the solid-liquid interface are such that the HTF will not form a wetting film and/or fill the pores of a solid adsorbent particle. In this second scenario, the HTF arriving at an adsorbent particle can form small droplets which roll-off the particle surface. To the degree that liquid is present on the surface of an adsorbent particle, any gas attempting to adsorb on the surface (and/or desorb from the surface) can have to diffuse through the liquid. Thus, the presence of a HTF in the adsorption environment can tend to reduce the rate of adsorption and/or desorption. This reduction can tend to be greater for adsorbent/HTF combinations where the HTF can wet the adsorbent surface. The reduction can also tend to be greater in situations where the gas being adsorbed is not soluble in the HTF. However, the need for solubility of a gas being adsorbed in the HTF can be reduced or minimized as the partial pressure of gas in the adsorption environment is increased.

During trickle bed operation, a variety of factors can be considered in order to select suitable operating conditions for adsorption. One factor can be having an adequate liquid flow rate for bed irrigation. The liquid flow rate per unit cross section area of the bed of adsorbent particles can be sufficient so that the adsorbent particles underneath are properly irrigated. Without proper irrigation, some of the adsorbent particles may not see any liquid and hence will not be cooled (heated) by the HTF. The liquid rate for good irrigation can depend upon the physical properties of the HTF such as density and viscosity, and also on the gas flow rate. In some aspects, the minimum flow rate can be at least about 1 kg $HTF/m^2/sec$.

Another factor can be having an adequate liquid rate for irrigation but not excessively high so as to totally envelope the adsorbent particles. When using a HTF with a reduced or minimized solubility for the gas component being adsorbed (such as $CO_2$), excessively high liquid flow rate can envelope the adsorbent particles with a liquid film which will hinder mass transfer. If the HTF has high solubility for the gas component being adsorbed at the operating pressure and temperature, then this requirement may be relaxed. Again, the amount of HTF that can result in enveloping the adsorbent particles will depend upon the liquid's physical properties. However, in general, a liquid flow rate in excess of about 4 or 5 kg HTF/m²/sec can raise this concern of the liquid enveloping the adsorbent.

In some aspects, pulsing of the HTF can reduce or minimize this concern. During pulsed operation, an HTF can be flowed during a portion of the cycle at a first flow rate, such as a flow rate of about 1 kg HTF/m²/sec to about 3 kg HTF/m²/sec. During other portions of the cycle, the flow rate can be increased (to at least 4 or at least 5 kg HTF/m²/sec) to allow for additional heat transfer. The increased flow rate during a pulse can reduce the amount of adsorption during the pulse, but desired levels of adsorption can be maintained by limiting pulses to short time periods and/or to small portions of the cycle. In some aspects, the length of a pulse of increased flow rate can be about 30 seconds or less, or about 10 seconds or less. Additionally or alternately, the percentage of a cycle corresponding to an increased flow pulse can be 20% or less of the cycle time, or 10% or less of the cycle time, or 5% or less of the cycle time. Additionally or alternately, the flow rate of HTF during an increased flow pulse can be at least about 25% greater than the average flow rate during an adsorption step, or at least about 50% greater.

Still another factor can be having an appropriate ratio of HTF to input gas flow to allow operation in a gas-continuous flow regime. The adsorber can preferably operate in the gas continuous flow regime and not in the liquid continuous (gas bubbles) flow regime. A gas continuous (liquid trickle flow) regime is the most common flow regime and can allow a gas component for adsorption (such as $CO_2$) to have access to the adsorbent particles.

Yet another factor can be selecting relative liquid flow rate to gas flow rate so that the thermal wave velocity in the bed of adsorbent particles is greater than the adsorption wave velocity. The adsorption wave velocity depends on the gas velocity and the adsorption capacity of the adsorbent. This adsorption wave velocity increases with an increasing gas velocity and decreases with an increasing adsorption capacity. The thermal wave velocity depends upon the liquid velocity and heat capacity. The thermal wave velocity increases with an increasing liquid velocity and heat capacity. The relative liquid/gas velocities can be chosen so that the thermal wave propagates faster than the adsorption wave. In various aspects, this condition can be satisfied by selecting flow rates of liquid and gas so that the thermal mass of the liquid is greater than the thermal mass of the gas, or $C_p(\text{liquid}) \times \text{mass}(\text{liquid}) > C_p(\text{gas}) \times \text{mass}(\text{gas})$.

Many adsorption/desorption processes use cyclic cooling/heating of the adsorbent bed. In these processes, the adsorbent bed is hot after it has gone through high temperature regeneration (desorption), and must be cooled before the adsorption step can start. Conventionally, this precooling step requires time, equipment and energy and is wasteful. By contrast, a trickle bed cooling process as described herein does not require this precooling step.

As an example, a trickle bed adsorber can be used for removal of $CO_2$ from a flue gas. In this example, the $CO_2$-containing flue gas enters the adsorbent bed from the top. $CO_2$ is first adsorbed in the top layer of the bed. As the top layer gets saturated with $CO_2$, adsorption happens on the next downstream layer and so on. Thus an "adsorption wave" is created which gradually travels from the top to bottom till the whole bed is saturated with $CO_2$. This adsorption wave will travel slowly when a high capacity $CO_2$ adsorbent is used such as the materials discussed in a latter part of this memo.

In a similar manner, when a heating (or cooling) fluid enters the bed from the top, it first heats (or cools) the top layer and then the successive downstream layers of the bed. In effect a thermal wave travels from the top to the bottom. If the heating fluid is a liquid and because the liquids have a high capacity for transporting heat, the thermal wave moves fast. The HTF essentially sweeps the heat downstream from the bed zone where adsorption is taking place, thereby keeping the adsorption zone cold.

Figure 6:
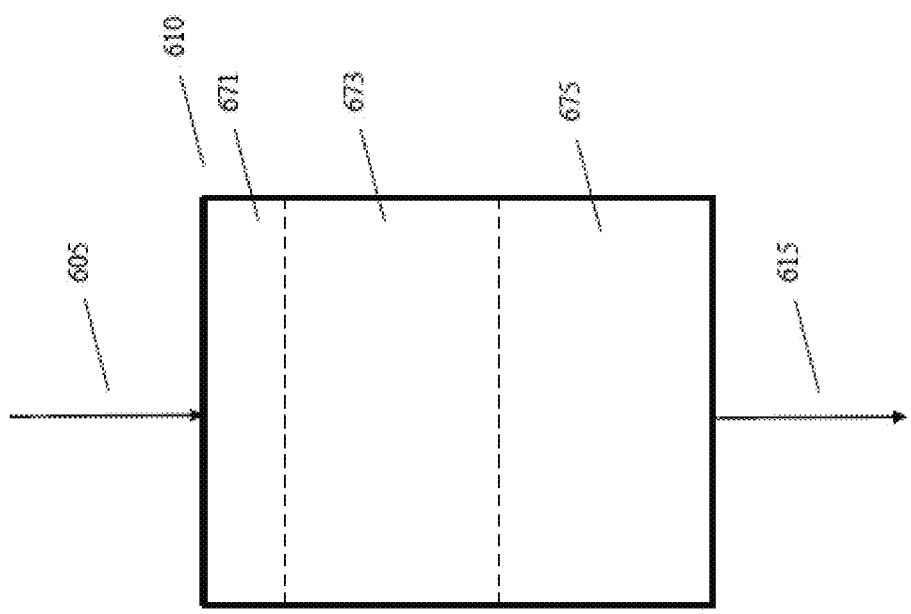
FIG. 6 schematically shows an example of operation of a trickle bed adsorber during an adsorption step when a heat transfer fluid is used.

An example of the relative movement of the thermal wave and adsorbent wave is schematically shown in FIG. 6. In FIG. 6, an input fluid 605 (corresponding to a mixture of input gas/input fluid and HTF that combine to provide the adsorption temperature) is introduced into a bed 610 of adsorbent particles. This results in adsorption of a gas component from the input fluid, resulting in an effluent 615 that has a reduced concentration of the gas component relative to the input fluid. At the beginning of the adsorption step, the bed 610 of adsorbent particles was at a higher temperature corresponding to a desorption step. As the adsorption step progresses, a first portion 671 of the bed corresponds to a portion of the bed that is at the adsorption temperature and that has already fully adsorbed the desired gas component. A second portion 673 of the bed corresponds to a portion that has been cooled to the adsorption temperature, but where adsorption has not occurred or has occurred incompletely. It is noted that the boundary between portions 671 and 673 will typically not be a sharp boundary. Similarly, the boundary between portion 673 and a portion 675 of the bed that has not been cooled yet by the HTF will typically also not be sharp.

Still another factor can be selecting flow rates that result in an acceptable pressure drop across the bed of adsorbent particles. Within the above constraints, the gas and liquid flow-rates should not be so high as to yield an unacceptably high pressure drop. This is more of an issue when processing a gas at low pressures (e.g, 1-2 atm).

It is noted that an advantage of a trickle bed contactor used in conjunction with a heat transfer fluid can be reducing, minimizing, or eliminating the time period between the end of the desorption step and the start of the adsorption step. In a conventional temperature swing adsorption process, after the desorption step, the adsorbent is cooled for a sufficient period of time to allow for adsorption. By contrast, use of a HTF can allow the adsorption step to start immediately. Due to the use of a liquid for heat transfer, the heat transfer fluid can cool the initial portion of the adsorbent bed sufficiently to allow nearly immediate adsorption of the gas component for adsorption. Under the factors noted above, the thermal wave velocity can be greater than the adsorption wave velocity. Introducing a HTF into a bed at the beginning of an adsorption step can quickly reduce the temperature of the upper portions of an adsorbent bed, so that adsorption can occur almost immediately even without prior cooling of the bed. Alternatively, the flow of HTF can be started prior to introduction of a gas component for adsorption, to allow for some cooling of the bed prior to the start of the adsorption step. It is noted that for some adsorbents, the length of the desorption step can be less than the length of the corresponding adsorption step. In such aspects, while the adsorption step is finishing in a first adsorbent bed, a second adsorbent bed can already have completed the desorption step. In this type of situation, the HTF can be introduced into the second adsorbent bed for cooling while the first adsorbent bed is still completing the adsorption step. This can allow for cooling prior to adsorption without requiring a separate or intermediate cooling step.

An alternative to a trickle bed configuration can be an upward flow configuration. In an upward flow configuration, a fixed bed of solid adsorbent is used but the gas-liquid mixture flows upwards instead of downwards. In this gas-liquid up-flow reactor, the flowing HTF fills up the empty space between the adsorbent particles and the flowing gas bubbles through it. The gas-liquid up-flow can lead to bed fluidization or fluffing and is therefore not as common in industrial practice as the gas-liquid down-flow or trickle bed reactor.

In gas-liquid up-flow configuration, substantially all of the catalyst particles are surrounded by the HTF. As a result, substantially all adsorption of gas by the adsorbent can involve diffusion of gas through the HTF. This can tend to result in higher diffusion resistance than in a trickle bed reactor configuration. The diffusion resistance can be reduced if the gas being adsorbed is soluble in the HTF.

Still another configuration can be a slurry adsorber, where the adsorbent particles are suspended in a slurry of the HTF. The gas for adsorption can be bubbled through the HTF. Similar to a gas-liquid up-flow configuration, adsorption of gas can require transport across the HTF before it reaches the adsorbent particle.

In some aspects, the desorption effluent produced during a desorption step can contain at least about 50 vol % of the gas component adsorbed during the adsorption step, or at least about 75 vol %, or at least about 90 vol %, or at least about 95 vol %, or at least about 98 vol %. In other aspects, a desorption effluent can be generated that has a reduced purity, such as due to use of an additional fluid to assist with desorption (such as by displacing the adsorbed component) and/or due to the gas component having a having an isotherm so that pressure in the contactor during desorption is greater than the adsorption pressure at the desorption temperature.

Use of Heat Transfer Fluid for Swing Adsorption

In various aspects, a heat transfer fluid (HTF) can be included in the multi-phase adsorption environment, along with the solid adsorbent particles and a gas containing at least one gas component for adsorption. Because a liquid is a condensed phase, the HTF can have a high thermal mass and/or can provide improved thermal transfer relative to a gas. This can allow the HTF to transfer heat to and from the adsorbent particles more efficiently. As a result, use of an HTF can allow a swing adsorption process to be performed at a temperature similar to the temperature of the total fluid input (HTF plus input gas) to the adsorber vessel. In a situation where the HTF and the input gas are introduced separately, thermodynamic calculations can be used to readily determine the expected temperature of the combined total input fluid flow.

A HTF can reduce or minimize the increase in the temperature of the adsorbent that occurs during an adsorption cycle. In a conventional temperature swing adsorption process, the heat released due to adsorption of a gas component can cause a substantial increase in the adsorbent temperature. Using a HTF can reduce or minimize such a temperature increase. Another potential benefit can be a reduced or minimized need for pre-heaters or pre-coolers to adjust the temperature of the input gas (or other input fluid) containing the gas component for adsorption. Due to the larger thermal mass of an HTF, mixing an input fluid flow with an HTF prior to adsorption can allow for adjustment of the temperature of the input fluid flow either without requiring a separate heater/cooler or with a reduced or minimized requirement for separate heating/cooling.

The temperature increase a during the adsorption step of a temperature swing adsorption process can be characterized in several ways. One option can be to characterize the difference in average adsorbent temperature at the beginning of an adsorption step in a cycle versus the average adsorbent temperature at the end of the adsorption cycle. This type of characterization can be performed for the total mass of adsorbent performing an adsorption step, such as the total mass of adsorbent in a contactor vessel. For a temperature swing adsorption process where the adsorbent has an average gas loading of at least about 0.01 mol/kg, or at least about 0.1 mol/kg, or at least about 1.0 mol/kg, or at least about 1.5 mol/kg, or at least about 2.0 mol/kg, or at least about 2.5 mol/kg, or at least about 3.0 mol/kg at the end of the adsorption step, the difference between the beginning temperature and the end temperature for an adsorption step can be about 50° C. or less, or about 35° C. or less, or about 25° C. or less, or about 20° C. or less, or about 15° C. or less, or about 10° C. or less, or about 5° C. or less.

In some aspects, it is noted that use of a HTF may cause a drop in temperature for the adsorbent particles under certain circumstances, such as at certain times during an adsorption step. Because temperature decreases can potentially occur, in some aspects a rate of temperature change at the beginning of an adsorption step may correspond to a decrease in temperature of greater than a specified rate, but any prior or subsequent increases in temperature may be less than a defined rate of temperature change.

A second potential advantage of using a HTF as part of the adsorption step is that the HTF can also be used to assist with the temperature swing of the adsorbent. During temperature swing adsorption, the temperature during adsorption can be substantially lower than the temperature during desorption. One of the difficulties in improving the cycle time of temperature swing adsorption processes can be the difficulty of changing the adsorbent temperature between adsorption and desorption portions of the cycle. A heat transfer fluid that is compatible for use during the adsorption step can also be used during temperature changes for the adsorbent. For example, separate heaters and coolers can be used to modify the temperature of the HTF at a location outside of a contactor vessel. The HTF at the modified temperature can then be introduced into the contactor vessel to increase or decrease the temperature of the adsorbent to a desired value.

It is noted that during temperature changes from adsorption to desorption and/or desorption to adsorption, the HTF can be recycled for additional heating and cooling in any convenient manner. For example, at the beginning of the transition from desorption to adsorption, HTF at the adsorption temperature can be introduced into the bed for cooling to the adsorption temperature. Initially, the HTF will be heated by the bed to a temperature near the desorption temperature. This initial portion of the heated HTF can be diverted to the heater for heating to the desorption temperature. After further cooling, the HTF entering the bed can have a smaller temperature increase, so it can be efficient to divert this mildly heated HTF to a cooler for cooling to the adsorption temperature.

A suitable HTF can be a liquid having one or more of the following general characteristics. A HTF can be non-toxic and of acceptable cost. A HTF can have a low vapor pressure to minimize its evaporative losses and contamination of the product gas streams. Additionally or alternately, a HTF can also have low viscosity, such as less than 10 centipoise, to prevent excessive pressure drop in the adsorber bed. Depending upon the application, the HTF can have desirable properties for adsorbent-wetting, solubility of an adsorbed/desorbed component, and/or diffusion of the adsorbed/desorbed component. In another aspect, the HTF can be a liquid that flashes to a gas when exposed to the heat of adsorption thereby affecting even greater heat transfer through evaporation.

Examples of suitable heat transfer fluids can include silane and/or silicone compounds, such as an organic substituted polysilane and/or polysiloxane. It is noted that a polysilane and/or polysiloxane can be a low molecular weight polysilane and/or polysiloxane that corresponds to 10 or fewer silicon-containing (silane or siloxane) monomers, or 5 or fewer. An example of a suitable organic substituted polysiloxane is tetramethyltetraphenyl trisiloxane. This type of organic substituted polysiloxane can have sufficient number of non-polar organic groups to reduce or minimize the ability of the heat transfer fluid to wet the surface of many types of adsorbents, including surfaces that are functionalized to reduce or minimize the wetting ability of liquids. Other examples of heat transfer fluids that can have a reduced likelihood to wet an adsorbent surface include liquid mercury and liquid indium-gallium alloys. Examples of heat transfer fluids that can be likely to wet the surfaces of many adsorbents include heat transfer fluids based on water, glycols, and/or other alcohols having a ratio of carbon atoms to oxygen atoms of about 4 or less. Still other options for heat transfer fluids, depending on the temperature range required between adsorption and desorption, can correspond to hydrocarbon oils based on polyalphaolefins.

With regard to wetting of the adsorbent particles, one option can be to pick a HTF that can wet (or not wet) the adsorbent particles as desired. Alternatively, the surface of the adsorbent particles can be functionalized or otherwise modified so that the HTF has a desired behavior with respect to wetting or not wetting the adsorbent particles. For example, the surface of the adsorbent particles can be functionalized so that an HTF does not wet the adsorbent surface. This can allow the HTF to interact with the adsorbent particle as rivulets and drops instead of as an enveloping film. Optionally, the functionalization can be used to select a surface energy for the adsorbent particles so that the flowing rivulets periodically coalesce and split again. Optionally, the pattern of such flowing rivulets can be time dependent, so that the flow pattern can vary on the solid surface. This can allow the HTF to contact different portions of the surface at different times, which can remove heat more effectively.

In some aspects, functionalizing the adsorbent particles can cause a HTF to not substantially wet the functionalized adsorbent particles. In such aspects, in a continuous gas phase adsorption environment, the functionalized adsorbent particles can have at least about 10% of their surface area exposed to the gas phase adsorption environment when the HTF is present, or at least about 20%, or at least about 30%.

As another example, an adsorbent surface can be functionalized to allow for total wetting with an HTF that has a high solubility and/or a high diffusion rate for a gas component being adsorbed. Optionally, the high diffusion rate for the HTF can be based on an additive in the HTF. This additive may be chosen such that a gas component binds or reacts with the additive on one side of the film and dissociates on the opposite side of the film. In other words, the additive can act to facilitate transport of the gas component across the liquid film in a rapid manner. As an example, for adsorption of $CO_2$, a heat transfer fluid can be selected that can wet the surface of an adsorbent particle and react with $CO_2$ to facilitate the transport across the liquid film, while maintaining high heat transfer from the solid to the liquid. Suitable heat transfer fluids having this behavior for $CO_2$ can include water and/or glycol, where the water and/or glycol contains an amine additive that has fast chemical kinetics. Such amine additives can be referred to as promoters. For example a solution of methylethylamine (MEA) in water or glycol can be used as an HTF, optionally with piperazine an additional promoter amine. A facilitated transport process using a promoter amine can be operated at without requiring high pressure. The dissolution of the amine into the liquid can be driven by the chemical potential, as opposed to being driven by a physical pressure gradient. It is noted that using an amine solution to provide total wetting and to facilitate transport may introduce substantial additional thermal mass to heat and/or cool.

For aspects where gas adsorption is desired under low pressure conditions, such as at about 1 bar (100 kPa), a combination of HTF and (optionally functionalized) adsorbent so that the HTF does not wet the surface can be desirable. Under lower pressure conditions, transport of gas across a fluid layer can be reduced or minimized. Having an HTF that does not wet the adsorbent particles can allow at least a portion of the surfaces of the adsorbent particles to be exposed. As pressure increases, such as at total pressures (or optionally partial pressures of a component for adsorption) of at least about 4 MPa, or at least about 6 MPa, the increased pressure can facilitate diffusion of gas through a wetted liquid layer.

Examples of surface modification or functionalization can include chemically treating the sorbent with species designed to alter partially or completely its hydrophobicity, hydrophilicity, oleophobicity, and/or oleophilicity. In some aspects, surface modification and/or functionalization can include treating adsorbent particles with silylating agents of linear or branched alkanes that may include internal (—$CF_2$—) or branched (—$CF_3$) or terminal (—$CF_3$) fluorinated species. This type of surface modification can be performed using chemical vapor deposition techniques and/or using solvent treatment techniques, such as the solvent treatment described in U.S. Pat. No. 8,814,986, which is incorporated herein by reference with regard to surface modification. The final adsorbent particles could be composed of fully or partially treated materials, or a mix of treated and untreated materials. Such a mix of material could be composed of beads of each or co-extruded product of treated and untreated materials.

In some alternative aspects, it is noted that a swing adsorption process using a HTF can be performed where the adsorption and desorption temperatures are similar, such as having a difference between adsorption and desorption of about 50° C. or less, or about 25° C. or less, or about 10° C. or less. The reduced or minimized difference between the desorption and adsorption temperatures can potentially be due to the ability to more tightly control the temperature during an adsorption or desorption process. Another possibility can be that desorption is facilitated by use of a utility fluid and/or a displacing component during desorption. This can allow for desorption of an adsorbed component at a purity of less than 100%, which may be suitable depending on the nature of the component being desorbed.

Example: High Working Capacity Adsorbents

In various aspects, use of a HTF as part of an adsorption environment can allow for an improvement of the working capacity of an adsorbent. Additionally or alternately, use of a HTF as part of an adsorption environment can enable use of some adsorbents that are not practical for use in conventional swing adsorption methods.

FIG. 1 shows an example of the benefit that can be achieved using a HTF to reduce or minimize the temperature increase during adsorption. As shown in FIG. 1, the idealized value of the working capacity for an adsorbent may be difficult to achieve without the use of an HTF, due to heating of the adsorbent during adsorption. Such deviation from idealized behavior can substantially reduce the working capacity. Use of an HTF can allow a desired temperature to be substantially maintained during adsorption, so that a working capacity approaching the idealized capacity can be realized. In some aspects, using an HTF can allow an adsorption temperature to be maintained during adsorption of a gas component from an input flow where the input flow has a concentration of the gas component of at least about 0.1 vol %, or at least about 0.5 vol %, or at least about 1.0 vol %, or at least about 2.0 vol %.

Figure 2:
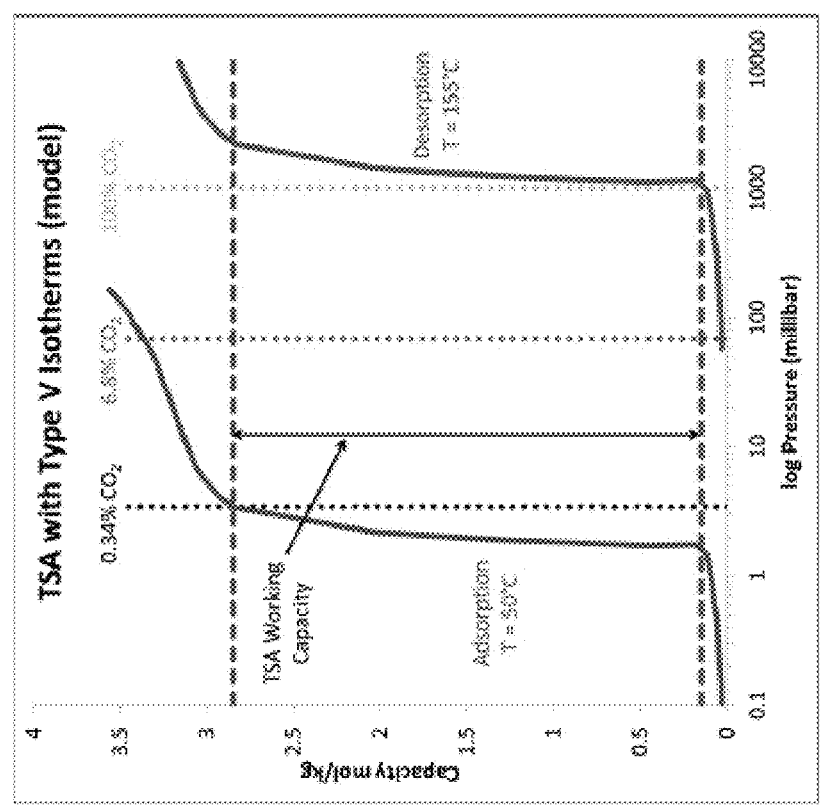
FIG. 2 schematically shows an example of adsorption isotherms and potential working capacity for adsorption of $CO_2$ by a Type V adsorbent.

Another type of benefit can be enabling the use of an adsorbent with a profile that would normally be considered unsuitable in a conventional configuration. FIG. 2 shows an example of $CO_2$ isotherms (calculated using an empirical model) for a material that is a Type V adsorbent for $CO_2$. The modeled material in FIG. 2 is mmen-$Mg_2$(dobpdc), where mmen is N,N'-dimethylethylenediamine and dobpdc is 4,4'-dioxido-3,3'-biphenyldicarboxylate. This material has a MOF-74 structure, with the mmen being a functionalization of the 18.4 Angstrom channels in the structure. Additional details regarding the material can be found, for example, in mmen-$Mg_2$(dobpdc) adsorbent, Thomas M. McDonald, Woo Ram Lee, Jarad A. Mason, Brian M. Wiers, Chang Seop Hong, and Jeffrey R. Long, J. Am. Chem. Soc. 2012, 134, 7056-7065. An additional advantage of mmen-$Mg_2$(dobpdc) can be that it is a suitable adsorbent for $CO_2$ at certain pressures while not being a strong adsorbent for $H_2O$. As shown in FIG. 2, significant adsorption of $CO_2$ can occur at temperatures of 50° C. or less at a partial pressure of $CO_2$ of as low as 0.03 bar. By contrast, the similar adsorption step for water does not occur until about 0.5 bar. This can allow the mmen-$Mg_2$(dobpdc) adsorbent to be used for separation of $CO_2$ from streams that contain water at standard pressure (about 1 bar or 100 kPa).

In the modeled isotherms shown in FIG. 2, mmen-$Mg_2$(dobpdc) exhibits a stepwise Type V isotherm increase in adsorption when a sufficient partial pressure of $CO_2$ is achieved. As a result, when used as an adsorbent for $CO_2$, mmen-$Mg_2$(dobpdc) can be highly sensitive to temperature increases. For process control, it can be desirable to have an initial adsorption temperature that is greater than ambient, so that the adsorption process is repeatable independent of ambient conditions. However, without the use of a heat transfer fluid, the heat generated during $CO_2$ adsorption of the about 3 mol/kg capacity of the adsorbent can increase the temperature of the adsorbent by about 50° C. Under conventional conditions, this can lead to low actual working capacity and/or unpredictable working capacity.

Using a heat transfer fluid, the temperature increase during adsorption of $CO_2$ by mmen-$Mg_2$(dobpdc) can be reduced or minimized, so that the temperature increase is for the adsorbent is 10° C. or less, or 5° C. or less, or 2° C. or less. For this type of reduced or minimized temperature increase, an initial adsorption temperature can be selected that allows for adsorption of at least the full stepwise increase in the isotherm.

In FIG. 2, the partial pressure of $CO_2$ present at a total pressure of about 1 bar (100 kPa) is shown for gas streams containing 0.34 vol % $CO_2$ and 6.8 vol % $CO_2$. As noted above, 6.8 vol % $CO_2$ can be representative of a typical refinery flue gas. A concentration of 0.34 vol % $CO_2$ can represent a desired reduction in $CO_2$ content of about 95% relative to an initial content of 6.8 vol % $CO_2$. Based on the large initial adsorption step, mmen-$Mg_2$(dobpdc) can potentially be useful for adsorption from even dilute $CO_2$ streams, so long as the temperature of the adsorbent can be maintained at or near a desired temperature. The adsorbed $CO_2$ can then be desorbed at a higher temperature, such as at least about 155° C., where a substantially pure $CO_2$ stream at about 100 kPa of pressure can be desorbed. Because of the stepwise nature of the Type V isotherms, the working capacity for mmen-$Mg_2$(dobpdc) can be similar to the total adsorption capacity, such as at least about 80% of the total capacity at the adsorption conditions, or at least about 90% of the total capacity. This is in contrast to the working capacity for many typical adsorbents having Type I isotherms, where the working capacity is less than about 1 mol/kg and/or the working capacity corresponds to less than about 50% of the total adsorbent capacity at the adsorption conditions.

It is noted that use of a HTF for adsorption of $CO_2$ by the mmen-$Mg_2$(dobpdc) can allow for loading of the adsorbent to a value greater than about 3.0 mol/kg, or greater than about 3.5 mol/kg. Such a loading can be difficult to achieve in the absence of a heat transfer fluid due to heating during adsorption.

In applications where the mass transfer driving force is not as large as in the current experiment, the use of a suitable liquid that does not enter the pores and therefore does not hinder $CO_2$ diffusion into the adsorbent would be beneficial. Another desirable characteristic of the percolating liquid is that the liquid does not fully envelope the adsorbent pellet with a film, thereby slowing $CO_2$ diffusion into the adsorbent pellet. Thus, a preferred liquid would have high interfacial tension so that it beads up instead of flowing as a film. Also, instead of a steady continuous flow of the percolating liquid, a pulsing flow will facilitate adsorption/desorption kinetics. In a pulsed liquid flow system, there are periodic time intervals when the adsorbent is not enveloped by the percolating liquid. During these intervals, the adsorbent is "dry" and $CO_2$ can diffuse in more rapidly.

Example: Adsorption of Other Gases

In addition to adsorption of $CO_2$, swing adsorption processes can be useful for adsorption of a variety of gas components from input fluid streams. One example can be removal of water from an input stream using a carbon adsorbent. Carbon adsorbents can exhibit a Type V isotherm for water, which is difficult to implement commercially without the use of an HTF. Use of an HTF can allow for control of the adsorbent temperature to allow carbon adsorbents to be used for water adsorption. Similar to $CO_2$, when using a HTF as part of a swing adsorption process for other gases, it can be beneficial to modify and/or functionalize the adsorbent. Additionally, it may further be beneficial to select a HTF that has a desirable ability to wet or not wet the (optionally functionalized) adsorbent.

Another example is dehydration of natural gas streams using conventional zeolite adsorbents. A temperature swing adsorption process can be used to substantially remove all water from a hydrocarbon stream (such as a natural gas stream), and then desorb the water at higher temperature, either as a substantially pure steam stream or with a diluent such as nitrogen.

Still another example can be separation of olefins from paraffins, where olefins are preferentially adsorbed by the adsorbent. Use of an HTF can allow for control of the temperature of the adsorbent to maintain a desirable adsorption selectivity.

Example: System Configuration for Separations Based on Multi-Phase Adsorption

Figure 3:
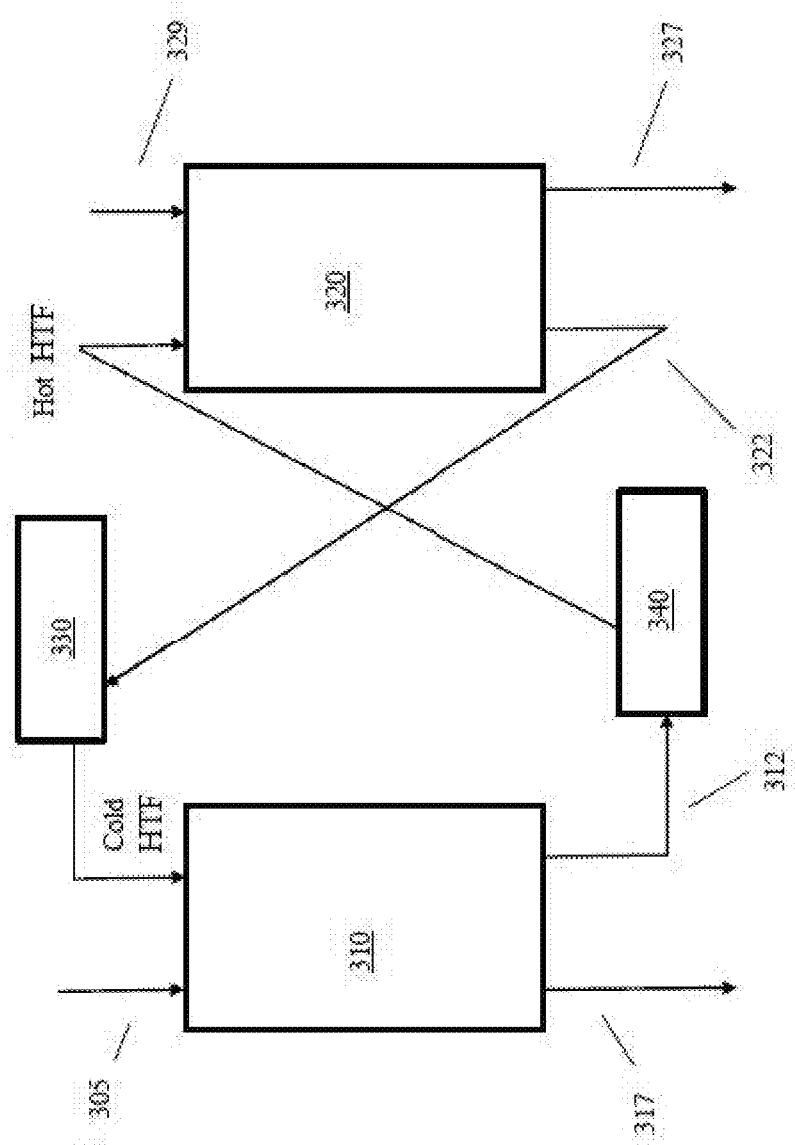
FIG. 3 schematically shows an example of a system suitable for performing a swing adsorption process using a heat transfer fluid.

FIG. 3 schematically shows an example of a system for using a heat transfer fluid as part of a temperature swing adsorption process using a trickle bed contactor configuration. The configuration in FIG. 3 is described in connection with a process for adsorption/desorption of $CO_2$ from a refinery or power plant flue gas, but it is understood that any convenient gas component can be adsorbed/desorbed using this type of configuration. In FIG. 3, two trickle beds contactors 310 and 320 can be used in tandem. The first trickle bed contactor 310 can adsorb $CO_2$ (such as from a flue gas feed 305) while producing a $CO_2$-depleted flue gas 317. The second trickle bed contactor can desorb the $CO_2$ that was adsorbed in the previous cycle to form a $CO_2$-containing effluent 327. Alternatively, any other convenient type of contactor (such as an up-flow contactor or a slurry contactor) can be used in place of the trickle bed contactors.

After a period of time, such as when the first bed is saturated (or mostly saturated) with $CO_2$ relative to the adsorption conditions and/or desorption is nearly complete in the second bed relative to the desorption conditions, the two beds can be switched. After a switch, the second trickle bed contactor 320 can adsorb $CO_2$ while the first trickle bed contactor 310 desorbs $CO_2$. The switching of adsorption and desorption beds can continue cycle after cycle to allow for continuous operation. It is noted that due to the ability to provide a thermal wave that moves more rapidly than the adsorption wave, the flow of gas for adsorption can be started at substantially the same time as the flow of HTF in the adsorbent bed.

In the example shown in FIG. 3, hot flue gas 305 containing $CO_2$ can be co-fed with cold heat transfer fluid (HTF) into the contactor 310 serving as the adsorber. The HTF can capture the heat of the flue gas 305 to cool the flue gas to roughly the desired adsorption temperature. The HTF can also adsorb the heat of adsorption from the adsorption of $CO_2$ on the adsorbent in order to roughly maintain the adsorbent in trickle bed contactor 310 at a desired temperature or in a desired temperature range. FIG. 3 shows an option where the moderately hot or warm HTF effluent 312 from the first trickle bed contactor 310 can then be further heated in a heater 340 and used for the desorption in the trickle bed contactor 320 serving as the desorber. Optionally, additional heat can also be introduced into trickle bed contactor 320 using steam 329, which can reduce or minimize the need for a separate heater 340 to heat the HTF. Alternatively, HTF effluent 312 from the first trickle bed contactor 310 can be returned to the cooler 330 instead (not shown). Similarly, FIG. 3 shows HTF effluent 322 cooled in the second (desorbing) trickle bed contactor 320 as being passed into the cooler 330 to form cold HTF for use in the first (adsorbing) trickle bed contactor 310. Alternatively, the effluent HTF 322 from the second trickle bed contactor 320 can be returned to the heater 340 to form hot HTF. Still another option can be to select the destination for HTF effluent (heater or cooler) based on the temperature of the HTF. For example, early in a cycle, HTF effluent from the first bed can be sufficiently warm to send to the heater, while later in the cycle the HTF effluent can be closer to the temperature of the cold HTF and therefore it is sent to the cooler. Other convenient ways of determining whether to recycle HTF effluent to the heater or the cooler will be apparent to those of skill in the art.

The heater in between the two beds may cause the release of some dissolved $CO_2$ and water in the circulating HTF. This $CO_2$+$H_2O$ vapor could be minimized by choosing a HTF which has a low water and $CO_2$ solubility. This emitted $CO_2$+$H_2O$ vapor in the heater can just be purged and discarded, sent to the $CO_2$ product stream, and/or sent to the desorption bed along with the HTF.

Example 1: $CO_2$ Adsorption Using Zeolite 13X in the Presence of Poly-Alpha-Olefins Liquid In this example, $CO_2$ separation by adsorption-desorption was performed using cyclic heating and cooling of a liquid percolated adsorbent bed. The adsorbent bed consisted of a 12 inch high packed bed of adsorbent particles of 13X zeolite. Glass beads of 2 mm diameter were used at both ends of the adsorbent bed to support the adsorbent particles and keep the bed in place. A prescribed volume of a Poly-Alpha-Olefins (PAO) liquid was charged into the column. This PAO liquid filled the empty space between the glass beads at the bottom end of the column and the empty space below these glass beads. The system was evacuated of air and moisture, filled with a prescribed volume of $CO_2$ gas and then sealed at both ends. Thermocouples and pressure transducers allowed temperature and pressure measurements in the adsorbent bed.

The sealed adsorbent bed allowed no inflow or outflow of $CO_2$ from the column. The adsorbent bed could be rotated 180 degrees such that the bottom end of the bed will move to the top and the top end will move to the bottom. This rotation caused the volume of PAO at the bottom end to move to the top and then to percolate down through the adsorbent particles in a trickle flow pattern. This percolated liquid then accumulated at the bottom. Periodic 180 degree rotation of the column allowed trickle flow irrigation of the adsorbent particles with PAO liquid in a cyclic manner.

As discussed earlier, percolation of the adsorbent bed with an appropriate hot liquid can be used to heat a large commercial size packed bed of adsorbent. Similarly, percolation with a cold liquid can be used to cool down the bed. This heating and cooling by the percolating liquid can be efficient because the percolating liquid and the adsorbent particles are in close proximity and in intimate direct contact. In this example, an additional method of cooling/heating the adsorbent was also provided. This additional method consisted of a heating/cooling jacket through which hot or cold air could be circulated to achieve the desired adsorbent temperature. It should be noted that in contrast to a pilot scale unit (such as the unit used in this example), a commercial size adsorbent bed (several feet in diameter) can be nearly adiabatic with little heat transfer through the column wall. In contrast to the higher surface to volume ratio of a pilot unit, a commercial scale unit can have a relatively low surface to volume ratio. This can avoid the need for a heating/cooling jacket in a commercial scale bed of adsorbent.

Figure 4:
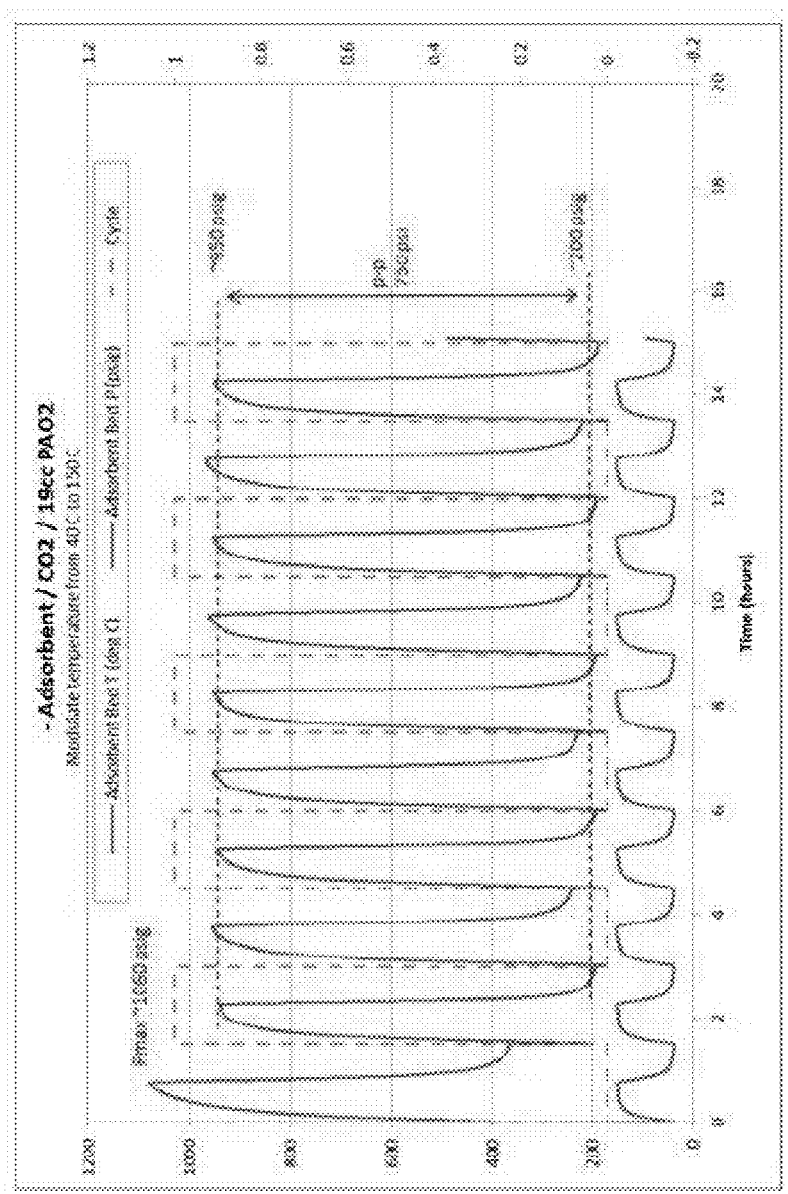
FIG. 4 shows results from adsorption of $CO_2$ by a Type I adsorbent using a polyalphaolefin heat transfer fluid.

During the experiments, the temperature of the adsorbent bed was periodically cycled between about 40° C. and about 150° C. This periodic cycling resulted in substantial pressure changes in the adsorbent bed. The pressure and temperature in the adsorbent bed during the periodic cycling is shown in FIG. 4. In FIG. 4, the lower curve schematically indicates (not to scale) the temperature modulation between 40° C. and 150° C., and the upper curve shows the resulting pressure within the reactor, which cycles between about 200 psig (1.4 MPag) and 950 psig (6.8 MPag). It should be noted that a part of the pressure increase at the higher temperature simply results from an expansion of $CO_2$ in a sealed-closed system. The rest of the pressure increase results from the $CO_2$ that is desorbed from the 13X adsorbent when temperature increases from 40° C. to 150° C.

Figure 5:
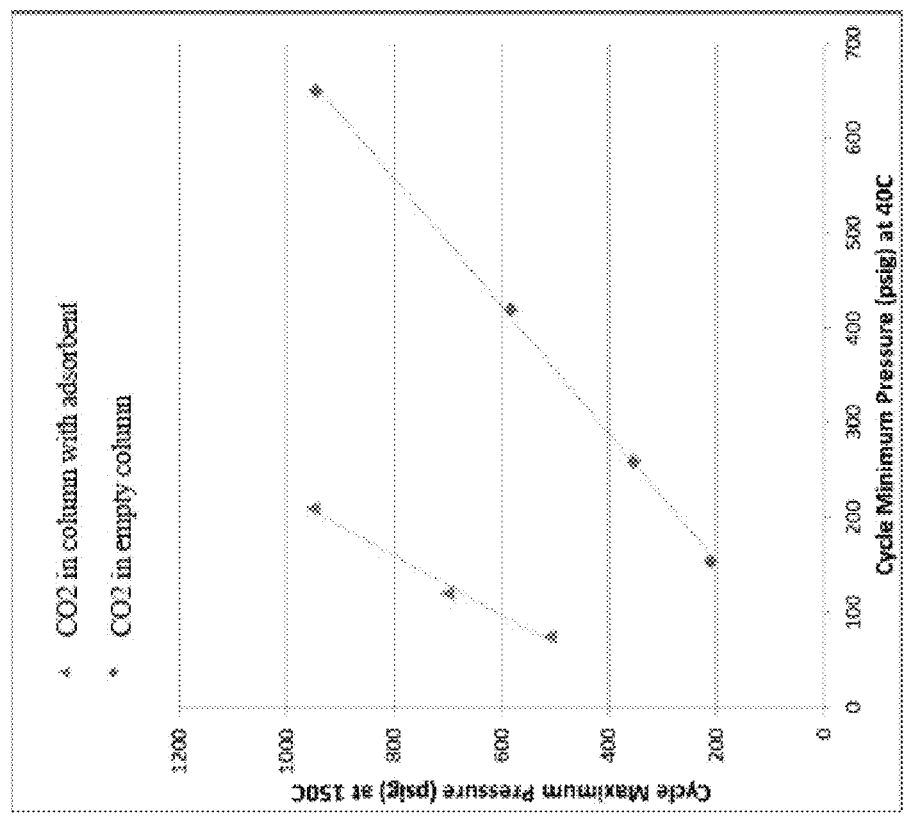
FIG. 5 shows pressure and temperature relationships for adsorber vessels that include or do not include an adsorbent.

FIG. 5 shows a comparison of the pressures at 150° C. and 40° C. for a column with a bed of 13X zeolite adsorbent and for a column without adsorbent. The significantly higher pressure ratio with the adsorbent (as compared to without adsorbent) indicates that significant $CO_2$ desorption occurs in a liquid percolated bed when the temperature increases from 40° C. to 150° C. This desorbed $CO_2$ can be separated out in a commercial adsorbent bed that is not a closed system but continuously receives flue gas.

The data in this example demonstrates that $CO_2$ can be separated by temperature cycling in a bed of liquid percolated adsorbent. In this pilot-scale data, the temperature cycling is slow (about 1.5 hours per cycle) and therefore the resulting adsorption-desorption cycling is also slow (about 1.5 hours per cycle). However, one of skill in the art will understand that conventional techniques can be used to decrease the time required for a cycle. This slow temperature cycling (and the resulting long adsorption-desorption cycles) in the lab merely reflects the fact that the lab column could be rotated only slowly (about 10 rotations in about 15 hours), and the fact that the column heating/cooling using a jacket is not rapid. Note that during each cycle the initial slope of the pressure rise is very steep when the temperature rises. This rapid temperature rise indicates a rapid mass transfer of $CO_2$ from the adsorbent to the gas phase.

Note that a reasonably rapid $CO_2$ mass-transfer between the gas and the adsorbent occurs even though the $CO_2$ needs to transfer through the PAO film surrounding the adsorbent pellet and then into the pellet with liquid filled pores. The rapid mass transfer is attributed to the high $CO_2$ pressure in this experiment which provides a large driving force for mass transfer.

Example 2: Adsorption Characteristics after Exposure to Heat Transfer Fluid with and without Omniphobic Coatings A series of experiments were conducted on Zeolite 5A (Sigma-Aldrich Molecular Sieve 5A, 8-12 mesh) and Zeolite 13X (BASF 13XBF Molecular Sieve beads, 8-12 mesh, 1.6-2.5 mm) to show adsorption characteristics of said zeolites with and without an omniphobic coating and before and after exposure to a heat transfer fluid. All materials were tested on a Mettler Toledo TGA/DSC 1 STAR System thermal gravimetric analysis (TGA) instrument with a 150° C. 12 hour $N_2$ pre-treatment prior to cycling with 100% $CO_2$ to remove any gases adsorbed gases while on the sample changer.

The general format of the test program included the following steps: (1) In 100% $N_2$, ramp from ambient temperature to 150° C. in 12 minutes at 50 ml/min, (2) in 100% $N_2$, hold at 150° C. for 12 hours at 100 ml/min, (3) in 100% $N_2$, cool to 50° C. in 5 min at 100 ml/min, (4) in 100% $N_2$, hold at 50° C. for 15 min at 100 ml/min to allow sample temperature to stabilize, (5) in 100% $CO_2$, hold at 50° C. for 15 min at 100 ml/min ($CO_2$ adsorption), (6) in 100% $N_2$, ramp from 50° C. to 150° C. in 6 min 40 sec at 100 ml/min and hold at 150° C. for 15 min at 100 ml/min ($N_2$ desorption), (7) in 100% $N_2$, cool to 50° C. in 6 min 40 sec at 100 ml/min, and (8) repeat steps 4-7 for further cycles.

Figure 15A:
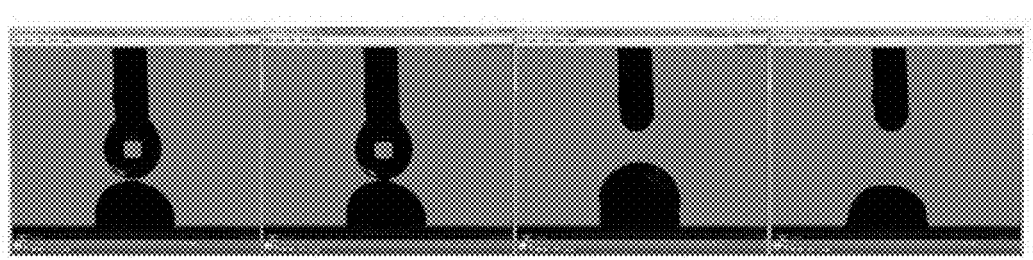
FIG. 15A qualitatively depicts the wettability of Zeolite 5A bead after contacting it with a liquid delivered by a syringe via video stills.
Figure 15B:
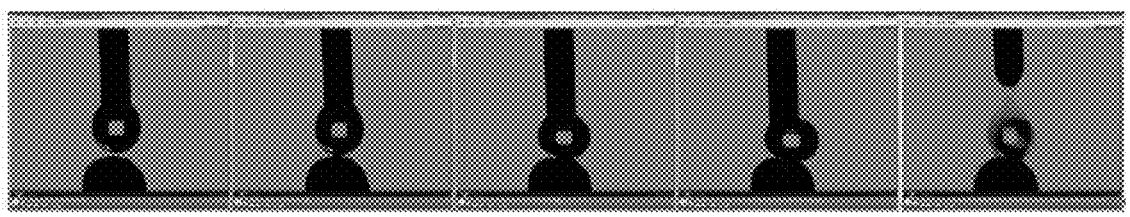
FIG. 15B qualitatively depicts the wettability of Zeolite 5A bead treated with an omniphobic coating after contacting it with a liquid delivered by a syringe via video stills.

The adsorbent material used was coated using a variety of methods such as liquid coating at 120° C., chemical vapor deposition at various temperatures ranging from 80-100° C., and rotary chemical vapor deposition at approximately 180° C. Such coating methods are known to a person of skill in the art. For all coating procedures, oven dried glassware was used unless otherwise noted and zeolite beads were activated at 350° C. for 16 hours prior to coating. FIGS. 15A and 15B provide a qualitative depiction of the effect of coating a material with an omniphobic chemical reagent such as trichloro(1H,1H,2H,2H-perfluorooctyl)silane. FIG. 15A represents video stills showing a drop of 1,3,3,5-tetramethyl-1,1,5,5-tetraphenyltrisiloxane (TMC704) being contacted with a single uncoated Zeolite 5A bead. A moment after contact (3rd still from left) the liquid drop completely wets the bead. FIG. 15B represents video stills showing a drop of TMC704 being contacted with a single coated Zeolite 5A bead. The liquid drop does not wet the bead. It can even be pressed into the bead until it deforms ($3^{rd}$ and 4th from left). Upon trying to disengage the syringe needle the liquid drops and rolls off the zeolite bead (5th from left).

The heat transfer fluids utilized in the experiments included 1,3,3,5-tetramethyl-1,1,5,5-tetraphenyltrisiloxane (TMC Industries Inc. 704 Silicone Diffusion Pump Fluid) having a Boiling Point at 0.5 Torr of 211° C. and Vapor Pressure at 25° C. of $10^{-7}$ to $10^{-8}$ torr and Polyalphaolefin (PAO) (ExxonMobil SpectraSyn2) having a Vapor Pressure at 150° C. of 18 torr. The coating agent used was trichloro(1H,1H,2H,2H-perfluorooctyl)silane (Alfa Aesar 97%).

Example 2A: $CO_2$ Adsorption Capacity for Coated Vs. Uncoated Zeolite 5A

In this experiment, both coated and uncoated Zeolite 5A were run through the above-described test program outside the presence of a heat transfer fluid. The adsorbent was coated via the reflux chemical vapor deposition (CVD) method. In a micro distillation column, 8-10 zeolite beads were suspended in glass wool under nitrogen. A flask containing approximately 10 mL of trichloro(1H,1H,2H,2H-perfluorooctyl)silane was attached to the column and heated to 100° C., as specified. The system was put under a mild vacuum (around 200 Torr) and heating and vacuum were maintained for 2 hours. The beads were removed and stored in a vial.

Figure 7:
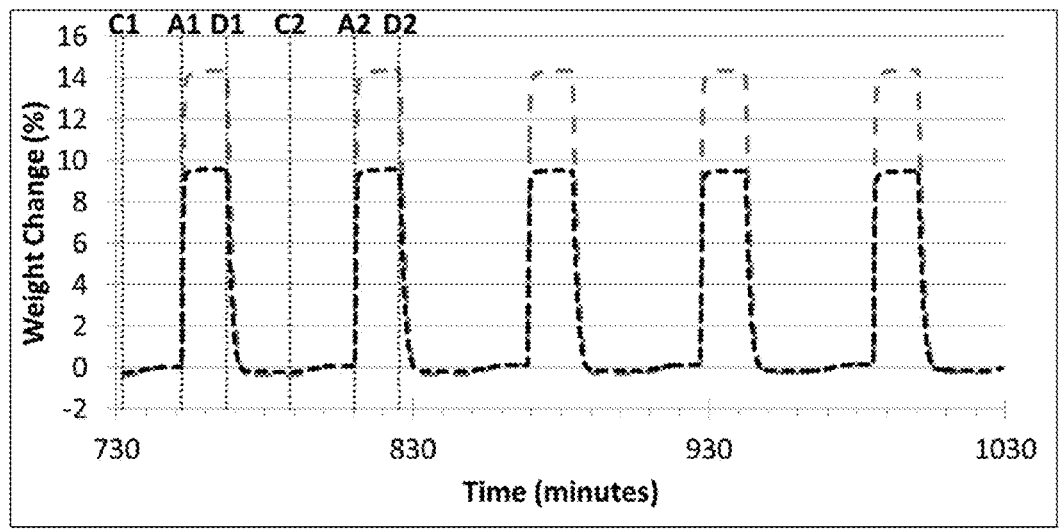
FIG. 7 depicts a comparison plot of $CO_2$ capacity for Zeolite 5A versus Zeolite 5A with an omniphobic coating.

FIG. 7 represents a TGA plot and shows the response of Zeolite 5A (grey dash) and Zeolite 5A Coated (black dash) to the TGA program cycle. C1 is the start of the first $N_2$ cooling cycle, A1 is the start of the first $CO_2$ adsorption cycle, D1 is the start of the first $N_2$ desorption cycle. C2, A2, and D2 denote the same instances for cycle 2. The zero weight change point is defined as 10 seconds before A1.

As shown, treating Zeolite 5A with trichloro(1H,1H,2H, 2H-perfluorooctyl)silane using the reflux CVD method gives a material with a decreased $CO_2$ capacity of about 33% at saturation but no change in kinetics is observed.

Example 2B: $CO_2$ Adsorption Capacity for Coated Vs. Uncoated Zeolite 5A in the Presence of a Heat Transfer Fluid In this experiment, both coated and uncoated Zeolite 5A were run through the above-described test program in the presence of a heat transfer fluid. In order to expose the adsorbents to the heat transfer fluid, the zeolite beads (for both the coated and uncoated Zeolite 5A) were submerged in TMC704 for 30-60 seconds and then contacted briefly with Kimwipes to remove excess liquid before being stored in a vial.

Figure 8:
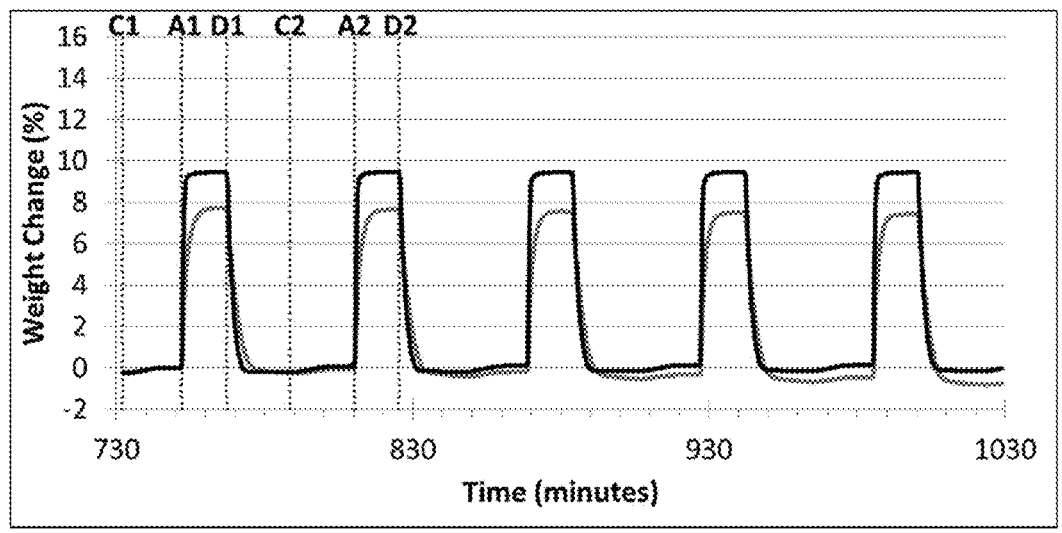
FIG. 8 depicts a comparison plot of $CO_2$ capacity for Zeolite 5A versus Zeolite 5A with an omniphobic coating after both are exposed to a heat transfer fluid (TMC704).

FIG. 8 represents a TGA plot and shows the response of Zeolite 5A+TMC704 (grey solid) and Zeolite 5A Coated+TMC704 (black solid) to the TGA program cycle. C1 is the start of the first $N_2$ cooling cycle, A1 is the start of the first $CO_2$ adsorption cycle, D1 is the start of the first $N_2$ desorption cycle. C2, A2, and D2 denote the same instances for cycle 2. The zero weight change point is defined as 10 seconds before A1.

As shown, treating Zeolite 5A with trichloro(1H,1H,2H,2H-perfluorooctyl)silane using the reflux CVD method gives a material, which after TMC704 exposure, has a $CO_2$ capacity 22% higher at saturation than uncoated Zeolite 5A after TMC704 exposure and the coated zeolite displays better adsorption kinetics.

Figure 9:
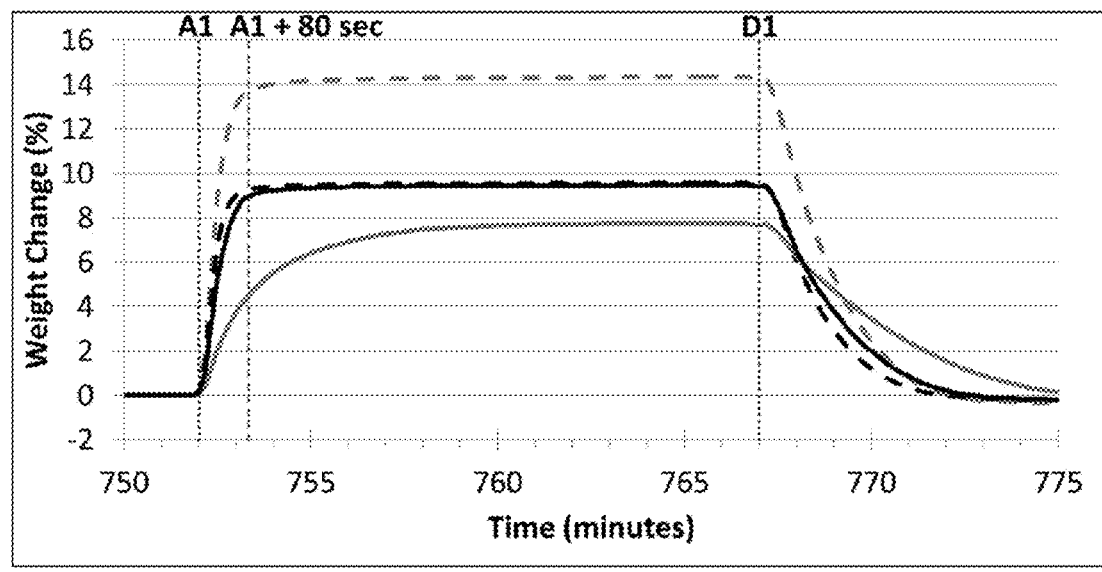
FIG. 9 depicts a comparison plot of $CO_2$ capacity for Zeolite 5A versus Zeolite 5A with an omniphobic coating before and after both are exposed to a heat transfer fluid (TMC704).

FIG. 9 represents a TGA plot of cycle 1 response of Zeolite 5A (grey dash), Zeolite 5A Coated (black dash), Zeolite 5A+TMC704 (grey solid) and Zeolite 5A Coated+TMC704 (black solid) to the TGA program cycle. A1 is the start of the first $CO_2$ adsorption cycle, A1+80 sec is 80 seconds after A1, D1 is the start of the first $N_2$ desorption cycle. The zero weight change point is defined as 10 seconds before A1. As shown, treating Zeolite 5A with trichloro(1H,1H,2H,2H-perfluorooctyl)silane using the reflux CVD method gives a material, which after TMC704 exposure, has essentially reached $CO_2$ saturation after 80 seconds and at this point has a $CO_2$ capacity 99% higher than uncoated Zeolite 5A after TMC704 exposure.

Example 2C: $CO_2$ Adsorption Capacity for Coated Vs. Uncoated Zeolite 13X

In this experiment, both coated and uncoated Zeolite 13X were run through the above-described test program outside the presence of a heat transfer fluid. The adsorbent was coated via the rotary chemical vapor deposition (CVD) method. An apparatus was prepared with a rotating (about 60 rpm) beveled flask containing zeolite beads on one end of a roughly horizontal tube. On the other end, nitrogen flowed slowly over a second flask containing approximately 10 mL of trichloro(1H,1H,2H,2H-perfluorooctyl)silane, into the rotating beveled flask and over the zeolite beads. The zeolite beads were maintained at 180° C. using external heat guns. The reaction continued for 3 hours. The beads were removed and stored in a vial.

Figure 10:
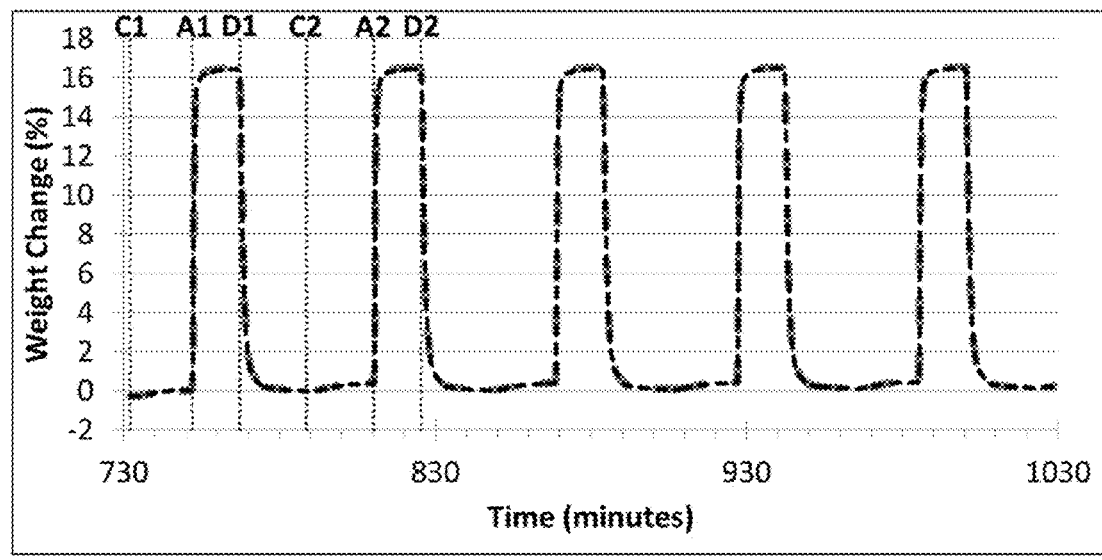
FIG. 10 depicts a comparison plot of $CO_2$ capacity for Zeolite 13X versus Zeolite 13X with an omniphobic coating.

FIG. 10 represents a TGA plot and shows the response of Zeolite 13X (grey dash) and Zeolite 13X Coated (black dash) to the TGA program cycle. C1 is the start of the first $N_2$ cooling cycle, A1 is the start of the first $CO_2$ adsorption cycle, D1 is the start of the first $N_2$ desorption cycle. C2, A2, and D2 denote the same instances for cycle 2. The zero weight change point is defined as 10 seconds before A1.

As shown, treating Zeolite 13X with trichloro(1H,1H,2H,2H-perfluorooctyl)silane using the rotary CVD method gives a material with a decreased $CO_2$ capacity of less than 1% at saturation with no change in observed kinetics.

Example 2D: $CO_2$ Adsorption Capacity for Coated Vs. Uncoated Zeolite 13X in the Presence of a Heat Transfer Fluid In this experiment, both coated and uncoated Zeolite 13X were run through the above-described test program in the presence of a heat transfer fluid. In order to expose the adsorbents to the heat transfer fluid, the zeolite beads (for both the coated and uncoated Zeolite 13X) were first dried in an oven at 150° C. for 16 hours and then cooled under $N_2$. The dried beads were then submerged in TMC704 for 10 minutes and then transferred to a Buchner funnel where the TMC704 was drained under vacuum. The beads were left on the filter for 2 minutes after the TMC704 had completely drained, in order to remove excess liquid and before being stored in a vial. The same procedure was followed with PAO.

Figure 11:
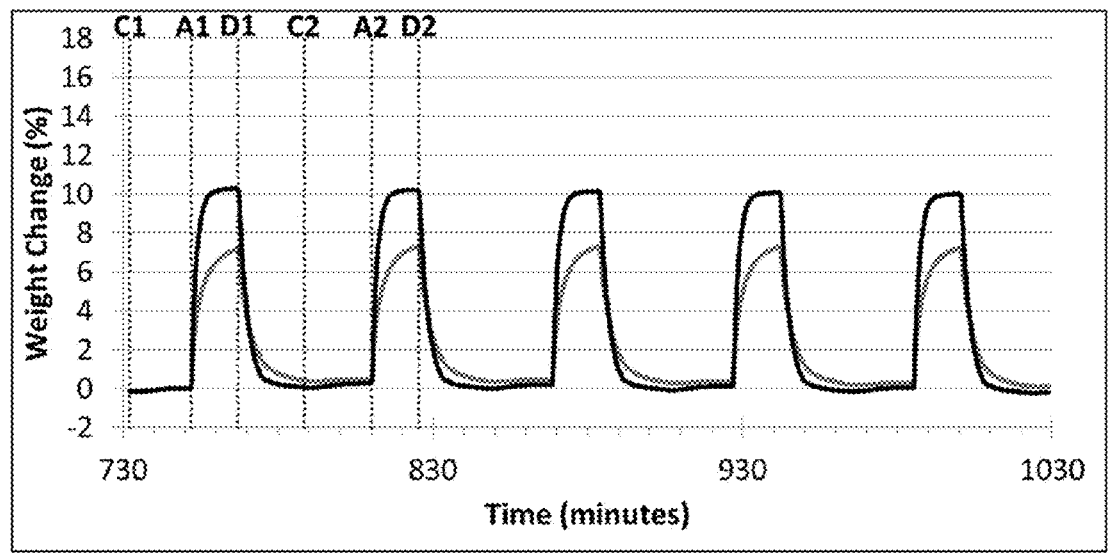
FIG. 11 depicts a comparison plot of $CO_2$ capacity for Zeolite 13X versus Zeolite 13X with an omniphobic coating after both are exposed to a heat transfer fluid (TMC704).

FIG. 11 represents a TGA plot and shows the response of Zeolite 13X+TMC704 (grey solid) and Zeolite 13X Coated+TMC704 (black solid) to the TGA program cycle. C1 is the start of the first $N_2$ cooling cycle, A1 is the start of the first $CO_2$ adsorption cycle, D1 is the start of the first $N_2$ desorption cycle. C2, A2, and D2 denote the same instances for cycle 2. The zero weight change point is defined as 10 seconds before A1.

As shown, treating Zeolite 13X with trichloro(1H,1H,2H,2H-perfluorooctyl)silane using the rotary CVD method gives a material, which after TMC704 exposure, has a $CO_2$ capacity 43% higher at saturation than uncoated Zeolite 13X after TMC704 exposure (which didn't get to saturation in the same time) and the coated zeolite displays better adsorption kinetics.

Figure 12:
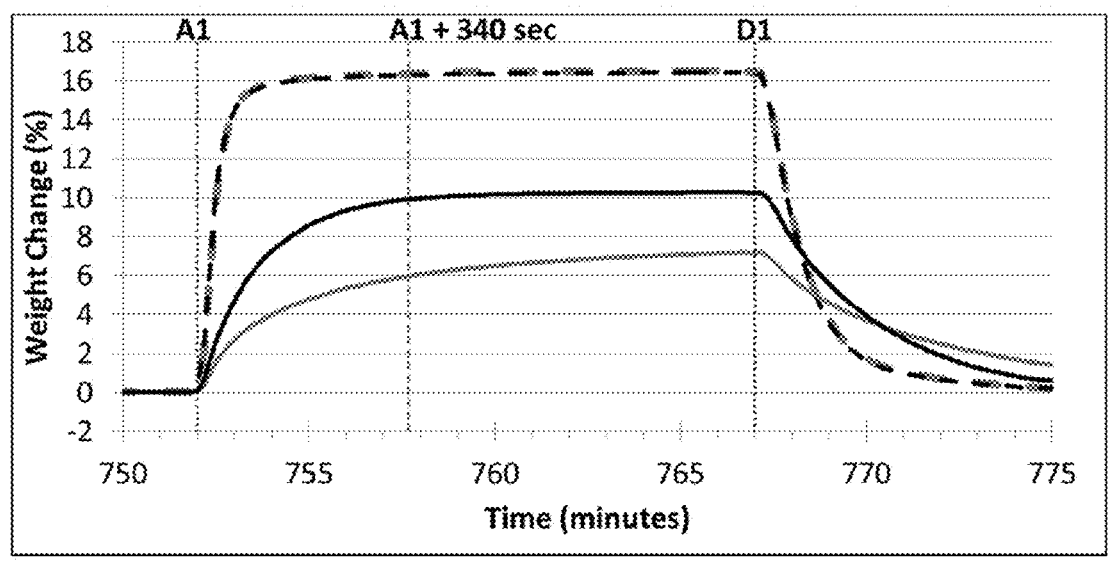
FIG. 12 depicts a comparison plot of $CO_2$ capacity for Zeolite 13X versus Zeolite 13X with an omniphobic coating before and after both are exposed to a heat transfer fluid (TMC704).

FIG. 12 is a TGA plot and shows the cycle 1 response of Zeolite 13X (grey dash), Zeolite 13X Coated (black dash), Zeolite 13X+TMC704 (grey solid) and Zeolite 13X Coated+TMC704 (black solid) to the TGA program cycle. A1 is the start of the first $CO_2$ adsorption cycle, A1+340 sec is 340 seconds after A1, D1 is the start of the first $N_2$ desorption cycle. The zero weight change point is defined as 10 seconds before A1.

As shown, treating Zeolite 13X with trichloro(1H,1H,2H,2H-perfluorooctyl)silane using the rotary CVD method gives a material, which after TMC704 exposure, has essentially reached $CO_2$ saturation after 340 seconds and at this point has a $CO_2$ capacity 66% higher than uncoated Zeolite 13X after TMC704 exposure.

Figure 13:
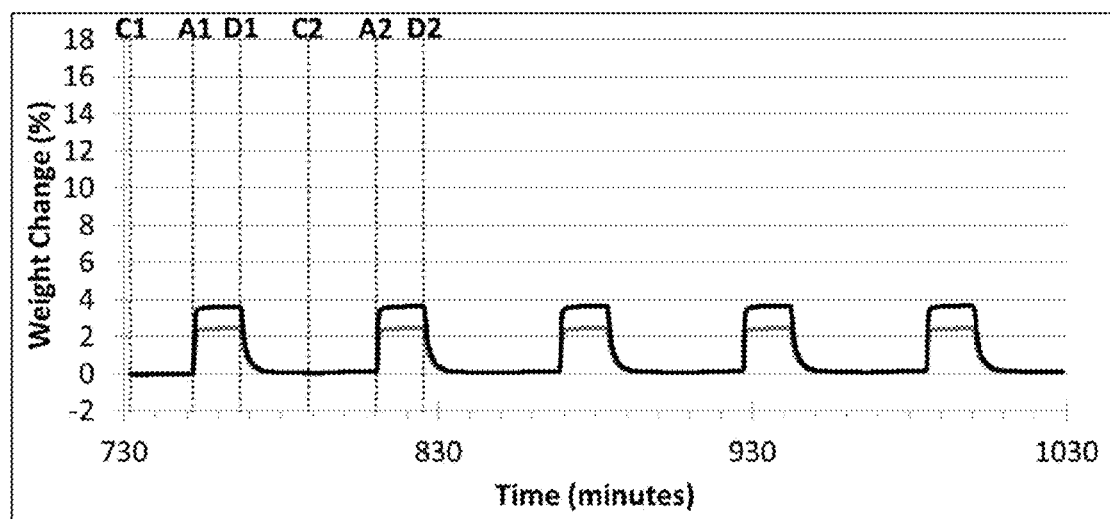
FIG. 13 depicts a comparison plot of $CO_2$ capacity for Zeolite 13X versus Zeolite 13X with an omniphobic coating after both are exposed to a heat transfer fluid (PAO).

FIG. 13 represents a TGA plot and shows the response of Zeolite 13X+PAO (grey solid) and Zeolite 13X Coated+PAO (black solid) to the TGA program cycle. C1 is the start of the first $N_2$ cooling cycle, A1 is the start of the first $CO_2$ adsorption cycle, D1 is the start of the first $N_2$ desorption cycle. C2, A2, and D2 denote the same instances for cycle 2. The zero weight change point is defined as 10 seconds before A1.

As shown, treating Zeolite 13X with trichloro(1H,1H,2H,2H-perfluorooctyl)silane using the rotary CVD method gives a material, which after PAO exposure, has a $CO_2$ capacity 48% higher at saturation than uncoated Zeolite 13X after PAO exposure.

Figure 14:
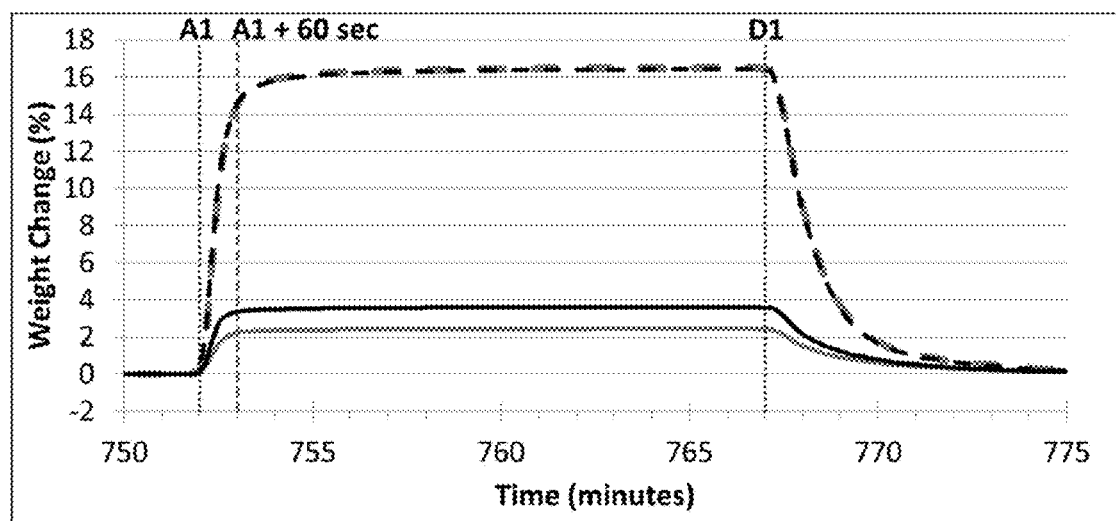
FIG. 14 depicts a comparison plot of $CO_2$ capacity for Zeolite 13X versus Zeolite 13X with an omniphobic coating before and after both are exposed to a heat transfer fluid (PAO).

FIG. 14 represents a TGA plot and shows the cycle 1 response of Zeolite 13X (grey dash), Zeolite 13X Coated (black dash), Zeolite 13X+PAO (grey solid) and Zeolite 13X Coated+PAO (black solid) to the TGA program cycle. A1 is the start of the first $CO_2$ adsorption cycle, A1+60 sec is 60 seconds after A1, D1 is the start of the first $N_2$ desorption cycle. The zero weight change point is defined as 10 seconds before A1.

As shown, treating Zeolite 13X with trichloro(1H,1H,2H,2H-perfluorooctyl)silane using the rotary CVD method gives a material, which after PAO exposure, has essentially reached $CO_2$ saturation after 60 seconds and at this point has a $CO_2$ capacity 50% higher than uncoated Zeolite 13X after PAO exposure.

Also of import is that the TMC704 exposed uncoated zeolite 13X has a 144% greater $CO_2$ capacity at saturation than PAO exposed uncoated zeolite 13X. Likewise the TMC704 exposed coated zeolite 13X has 196% greater $CO_2$ capacity at saturation than PAO exposed coated zeolite 13X.

These results show how the choice of adsorbent, the effect of coating the zeolite adsorbent and choice of the heat transfer fluid can affect the $CO_2$ adsorption capacity and kinetics, all of which are tuneable parameters.

Additional Embodiments

Additionally or alternately, the present invention can include one or more of the following embodiments.

Embodiment 1

A method for adsorbing a gas component, comprising: exposing an input fluid comprising a first gas component and a heat transfer fluid to adsorbent particles to produce an adsorbent effluent having a lower concentration of the first gas component than the input fluid, the input fluid comprising a first temperature prior to contacting the adsorbent particles, a loading of adsorbed first gas component in the adsorbent particles at the end of the exposing being at least about 0.01 mol/kg, or at least about 0.1 mol/kg, or at least about 0.2 mol/kg, or at least about 0.5 mol/kg, or at least about 1.0 mol/kg, or at least about 2.0 mol/kg, or at least about 3.0 mol/kg; and desorbing at least a portion of the first gas component from the adsorbent particles at a desorption temperature greater than the first temperature.

Embodiment 2

The method of Embodiment 1, wherein the first gas component comprises $CO_2$.

Embodiment 3

The method of any of the above embodiments, wherein the adsorbent particles comprise a Type V adsorbent.

Embodiment 4

A method for adsorbing $CO_2$, comprising: exposing an input fluid comprising $CO_2$ and a heat transfer fluid to adsorbent particles to produce an adsorbent effluent having a lower concentration of $CO_2$ than the input fluid, the input fluid comprising a first temperature prior to contacting the adsorbent particles, a loading of adsorbed $CO_2$ in the adsorbent particles at the end of the exposing being at least about 0.01 mol/kg, or at least about 0.1 mol/kg, or at least about 0.2 mol/kg, or at least about 0.5 mol/kg, or at least about 1.0 mol/kg, or at least about 2.0 mol/kg, or at least about 3.0 mol/kg; and desorbing $CO_2$ from the adsorbent particles at a desorption temperature greater than the first temperature.

Embodiment 5

A method for adsorbing a gas component, comprising: exposing an input fluid comprising a first gas component and a heat transfer fluid to adsorbent particles comprising a Type V adsorbent to produce an adsorbent effluent having a lower concentration of the first gas component than the input fluid, the input fluid comprising a first temperature prior to contacting the adsorbent particles, a loading of adsorbed first gas component in the adsorbent particles at the end of the exposing being at least about 0.01 mol/kg, or at least about 0.1 mol/kg, or at least about 0.2 mol/kg, or at least about 0.5 mol/kg, or at least about 1.0 mol/kg, or at least about 2.0 mol/kg, or at least about 3.0 mol/kg; and desorbing at least a portion of the first gas component from the adsorbent particles at a desorption temperature greater than the first temperature.

Embodiment 6

The method of any of the above embodiments, wherein the desorption temperature is greater than the first temperature by at least about 25° C., or at least about 50° C., and/or about 150° C. or less, or about 100° C. or less, or about 75° C. or less, or about 50° C. or less.

Embodiment 7

The method of any of the above embodiments, wherein the adsorbent particles are exposed to the heat transfer fluid at a second temperature for a period of time prior to the exposing the adsorbent particles to the input fluid at the first temperature, the second temperature optionally being different from the first temperature by about 10° C. or less.

Embodiment 8

A method for adsorbing a gas component, comprising: exposing an input fluid comprising a first gas component and a heat transfer fluid to adsorbent particles to produce an adsorbent effluent having a lower concentration of the first gas component than the input fluid, the input fluid comprising a first temperature prior to contacting the adsorbent particles, a loading of adsorbed first gas component in the adsorbent particles at the end of the exposing being at least about 0.01 mol/kg, or at least about 0.1 mol/kg, or at least about 0.2 mol/kg, or at least about 0.5 mol/kg, or at least about 1.0 mol/kg, or at least about 2.0 mol/kg, or at least about 3.0 mol/kg; and desorbing at least a portion of the first gas component from the adsorbent particles at a desorption temperature, the desorption temperature being less than about 10° C. different from the first temperature.

Embodiment 9

The method of any of the above embodiments, wherein a loading of adsorbed first gas component or adsorbed $CO_2$ in the adsorbent particles after the desorbing is less than 90% of the loading of adsorbed first gas component or adsorbed $CO_2$ in the adsorbent particles at the end of the exposing, or less than 70% of the loading, or less than 50% of the loading, or less than 25% of the loading, or less than 10% of the loading, or less than 1% of the loading.

Embodiment 10

The method of any of the above embodiments, wherein the loading of the adsorbed first gas component or adsorbed $CO_2$ in the adsorbent particles after the desorbing is about 3.0 mol/kg or less, or about 2.5 mol/kg or less, or about 2.0 mol/kg or less, or about 1.5 mol/kg or less, about 1.0 mol/kg or less, or about 0.5 mol/kg or less, or about 0.1 mol/kg or less, or about 0.01 mol/kg or less, and/or at least about 0.5 mol/kg, or at least about 1.0 mol/kg.

Embodiment 11

The method of any of the above embodiments, wherein the adsorbent particles comprise a Type I adsorbent, a Type V adsorbent, or a combination thereof.

Embodiment 12

The method of any of the above embodiments, wherein the exposing the input fluid to the adsorbent particles comprises exposing the input fluid to the adsorbent particles in a slurry contactor, a fluidized bed contactor, a trickle bed contactor, or a combination thereof.

Embodiment 13

The method of Embodiment 12, wherein the input fluid is exposed to the adsorbent particles in a trickle bed contactor, the first gas component and the heat transfer fluid being introduced into the trickle bed contactor as separate fluids.

Embodiment 14

The method of any of the above embodiments, wherein the input fluid comprises a variable amount of the heat transfer fluid during the exposing.

Embodiment 15

The method of Embodiment 14, wherein the input fluid comprises one or more pulses of the heat transfer fluid, the input fluid optionally comprising a pulse of the heat transfer fluid during less than about 10% of a time for the exposing, or less than about 5% of a time for the exposing, a flow rate of the heat transfer fluid during a pulse optionally being at least about 25% greater than an average flow rate of the heat transfer fluid during the exposing, or at least about 50% greater.

Embodiment 16

The method of any of the above embodiments, wherein the adsorbent particles comprise functionalized adsorbent particles.

Embodiment 17

The method of Embodiment 16, wherein the heat transfer fluid does not substantially wet the functionalized adsorbent particles.

Embodiment 18

The method of any of the above embodiments, wherein the desorbing of the adsorbed first gas component or the adsorbed $CO_2$ comprises forming a desorption effluent comprising at least about 90 vol % of the first gas component or $CO_2$, or at least about 95 vol %, or at least about 98 vol %.

Embodiment 19

The method of any of the above embodiments, wherein the desorbing of the adsorbed first gas component or the adsorbed $CO_2$ comprises forming a desorption effluent comprising about 90 vol % or less of the first gas component or $CO_2$, or about 75 vol % or less, or about 50 vol % or less, and/or at least about 10 vol %, or at least about 25 vol %.

Embodiment 20

A system for separation of $CO_2$ from a gas flow comprising a bed of adsorbent particles, the adsorbent particles comprising mmen-$Mg_2$(dobpdc) having an adsorbent loading of at least about 3.0 moles of $CO_2$ per kilogram of adsorbent; and a heat transfer liquid in fluid connectivity with the contactor.

Embodiment 21

The contactor of Embodiment 20, wherein the contactor comprises a trickle bed contactor.

Although the present invention has been described in terms of specific embodiments, it is not so limited. Suitable alterations/modifications for operation under specific conditions should be apparent to those skilled in the art. It is therefore intended that the following claims be interpreted as covering all such alterations/modifications as fall within the true spirit/scope of the invention.

The invention claimed is:

1. A method for adsorbing a gas component, comprising:
   exposing an input fluid comprising a first gas component and a heat transfer liquid to adsorbent particles to produce an adsorbent effluent having a lower concentration of the first gas component than the input fluid, the input fluid comprising a first temperature prior to contacting the adsorbent particles, a loading of adsorbed first gas component in the adsorbent particles at the end of the exposing being at least about 0.01 mol/kg; and
   desorbing at least a portion of the first gas component from the adsorbent particles at a desorption temperature greater than the first temperature.

2. The method of claim 1, wherein the first gas component comprises $CO_2$.

3. The method of claim 1, wherein the adsorbent particles comprise a Type V adsorbent.

4. The method of claim 1, wherein a loading of adsorbed first gas component in the adsorbent particles after the desorbing is less than 50% of the loading of first gas component in the adsorbent particles at the end of the exposing.

5. The method of claim 1, wherein the desorption temperature is greater than the first temperature by at least about 25° C.

6. The method of claim 1, wherein the adsorbent particles are exposed to the heat transfer liquid at a second temperature for a period of time prior to the exposing the adsorbent particles to the input fluid at the first temperature.

7. The method of claim 6, wherein the second temperature differs from the first temperature by about 10° C. or less.

8. The method of claim 1, wherein the loading of adsorbed first gas component in the adsorbent particles after the desorbing is about 0.5 mol/kg or less.

9. The method of claim 1, wherein the loading of the adsorbed first gas component in the adsorbent particles after the desorbing is about 0.5 mol/kg to about 3.0 mol/kg.

10. The method of claim 1, wherein the adsorbent particles comprise a Type I adsorbent, a Type V adsorbent, or a combination thereof.

11. The method of claim 1, wherein the exposing the input fluid to the adsorbent particles comprises exposing the input fluid to the adsorbent particles in a slurry contactor, a fluidized bed contactor, a trickle bed contactor, or a combination thereof.

12. The method of claim 11, wherein the input fluid is exposed to the adsorbent particles in a trickle bed contactor, the first gas component and the input fluid being introduced into the trickle bed contactor as separate fluids.

13. The method of claim 1, wherein the input fluid comprises a variable amount of the heat transfer liquid during the exposing.

14. The method of claim 13, wherein the input fluid comprises one or more pulses of the heat transfer liquid, a flow rate of the heat transfer liquid during a pulse being at least about 25% greater than an average flow rate of the heat transfer liquid during the exposing.

15. The method of claim 1, wherein the adsorbent particles comprise functionalized adsorbent particles.

16. The method of claim 15, wherein the heat transfer liquid does not substantially wet the functionalized adsorbent particles.

17. The method of claim 1, wherein the desorbing of the adsorbed first gas component comprises forming a desorption effluent comprising at least about 90 vol % of the first gas component.

18. The method of claim 1, wherein the adsorbent particles are coated with an omniphobic coating.

19. The method of claim 1 or 18, wherein the adsorbent particles comprise one of Zeolite 5A, mmen-Mg$_2$(dobpdc), and Zeolite 13X.

20. The method of claim 18, wherein the omniphobic coating is applied via one of chemical vapor deposition and rotary chemical vapor deposition.

21. The method of claim 18, wherein the omniphobic coating is trichloro(1H,1H,2H,2H-perfluorooctyl)silane.

22. A method for adsorbing $CO_2$, comprising:
exposing an input fluid comprising $CO_2$ and a heat transfer liquid to adsorbent particles to produce an adsorbent effluent having a lower concentration of $CO_2$ than the input fluid, the input fluid comprising a first temperature prior to contacting the adsorbent particles, a loading of adsorbed $CO_2$ in the adsorbent particles at the end of the exposing being at least about 0.01 mol/kg; and
desorbing $CO_2$ from the adsorbent particles at a desorption temperature greater than the first temperature.

23. A method for adsorbing a gas component, comprising:
exposing an input fluid comprising a first gas component and a heat transfer liquid to adsorbent particles having a Type V adsorption isotherm to produce an adsorbent effluent having a lower concentration of the first gas component than the input fluid, the input fluid comprising a first temperature prior to contacting the adsorbent particles, a loading of adsorbed first gas component in the adsorbent particles at the end of the exposing being at least about 0.01 mol/kg; and
desorbing at least a portion of the first gas component from the adsorbent particles at a desorption temperature greater than the first temperature.

24. A method for adsorbing a gas component, comprising:
exposing an input fluid comprising a first gas component and a heat transfer liquid to adsorbent particles to produce an adsorbent effluent having a lower concentration of the first gas component than the input fluid, the input fluid comprising a first temperature prior to contacting the adsorbent particles, a loading of adsorbed first gas component in the adsorbent particles at the end of the exposing being at least about 0.01 mol/kg; and
desorbing at least a portion of the first gas component from the adsorbent particles at a desorption temperature, the desorption temperature being less than about 10° C. different from the first temperature.

25. A system for separation of $CO_2$ from a gas flow, the system comprising:
a contactor comprising a bed of adsorbent particles, the adsorbent particles comprising mmen-Mg$_2$(dobpdc) having an adsorbent loading of at least about 3.0 moles of $CO_2$ per kilogram of adsorbent; and
a heat transfer liquid in fluid connectivity with the contactor.

26. The system of claim 25, wherein the contactor comprises a trickle bed contactor.

* * * * *